United States Patent [19]

Hirata et al.

[11] Patent Number: 5,384,622
[45] Date of Patent: Jan. 24, 1995

[54] SYSTEM OF CONTROLLING A PLURALITY OF COPYING MACHINES INTERCONNNECTED THROUGH A PRIVATE BRANCH EXCHANGE

[75] Inventors: Sumiaki Hirata, Aichi; Kazunobu Maekawa, Toyokawa, both of Japan

[73] Assignee: Minolta Camera Kabushiki Kaisha, Osaka, Japan

[21] Appl. No.: 977,610

[22] Filed: Nov. 17, 1992

[30] Foreign Application Priority Data

Nov. 18, 1991 [JP] Japan .................. 3-329548
Nov. 19, 1991 [JP] Japan .................. 3-329916

[51] Int. Cl.⁶ ...................... G03G 21/00; H04M 11/00
[52] U.S. Cl. ...................... 355/206; 355/208; 379/106
[58] Field of Search ............... 355/203, 204, 205, 206, 355/207, 208; 371/16.4, 16.5; 364/132, 184, 185, 186; 379/92, 93, 100, 106

[56] References Cited

U.S. PATENT DOCUMENTS

| | | | |
|---|---|---|---|
| 3,899,774 | 8/1975 | Binnie et al. | 379/106 X |
| 3,997,873 | 12/1976 | Thornton | 340/149 R |
| 4,162,396 | 7/1979 | Howard et al. | 355/206 X |
| 4,167,322 | 9/1979 | Yano et al. | 355/204 X |
| 4,390,953 | 6/1983 | Johnstone | 364/474 |
| 4,497,037 | 1/1985 | Kato et al. | 355/202 X |
| 4,583,834 | 4/1986 | Seko et al. | 355/206 |
| 4,766,548 | 8/1988 | Cedrone et al. | 364/479 |
| 4,797,706 | 1/1989 | Sugishima et al. | 355/200 X |
| 5,003,583 | 3/1991 | Iggulden et al. | 379/100 |
| 5,021,826 | 6/1991 | Maruta | 355/205 |
| 5,077,582 | 12/1991 | Kravette et al. | 355/206 |
| 5,084,875 | 1/1992 | Weinberger et al. | 371/16.4 X |
| 5,146,269 | 9/1992 | Shimizu et al. | 355/200 |
| 5,184,179 | 2/1993 | Tarr et al. | 355/206 |
| 5,214,772 | 5/1993 | Weinberger et al. | 355/202 X |
| 5,216,461 | 6/1993 | Maekawa et al. | 355/202 |
| 5,220,380 | 6/1993 | Hirata et al. | 355/204 |
| 5,224,157 | 6/1993 | Yamada et al. | 379/100 |

FOREIGN PATENT DOCUMENTS 59-142559  8/1984  Japan .
1-291566  11/1989  Japan .

OTHER PUBLICATIONS

Research Newsletter—"Remote Diagnostics–Tool Kit of the Future", Dataquest, pp. 1–6, Feb., 1989.

Primary Examiner—A. T. Grimley
Assistant Examiner—Nestor R. Ramirez
Attorney, Agent, or Firm—Burns, Doane, Swecker & Mathis

[57] ABSTRACT

In a method and system for controlling a plurality of copying machines, plural control units respectively associated with the copying machines are connected with one another by means of a private branch exchange (PBX) telephone system. A control unit calls one or more of the other control units, internally through the extension lines of the PBX, at a prescribed data and time, to detect any abnormality in the operation of the called unit. If an abnormality is detected, a call is placed to a control center located external to the PBX, to thereby inform the control center of the detected abnormality.

14 Claims, 24 Drawing Sheets

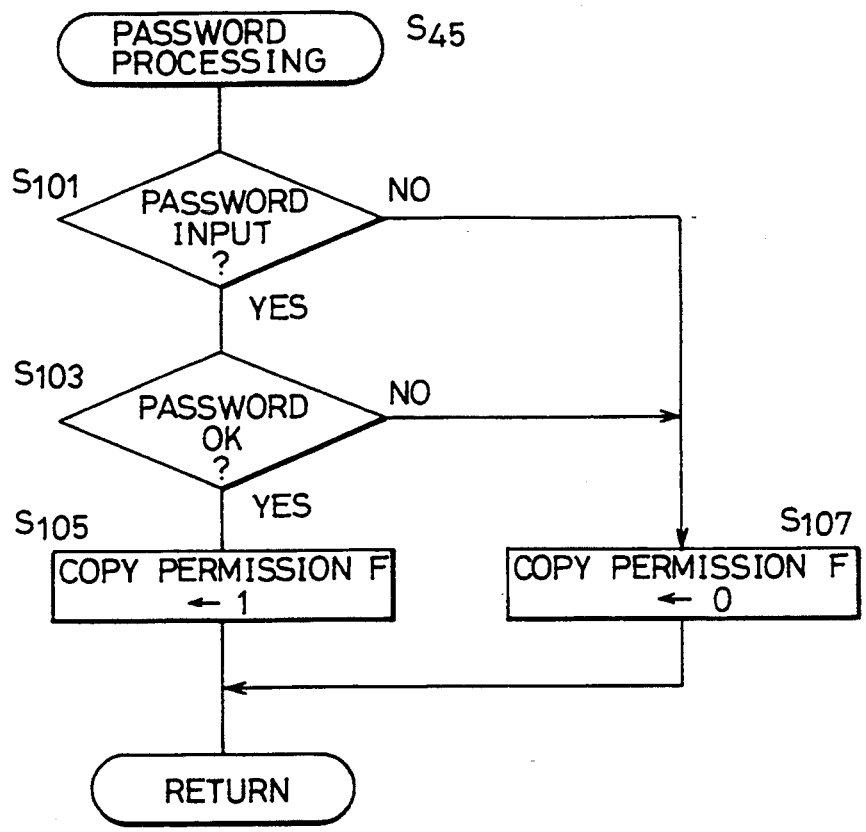
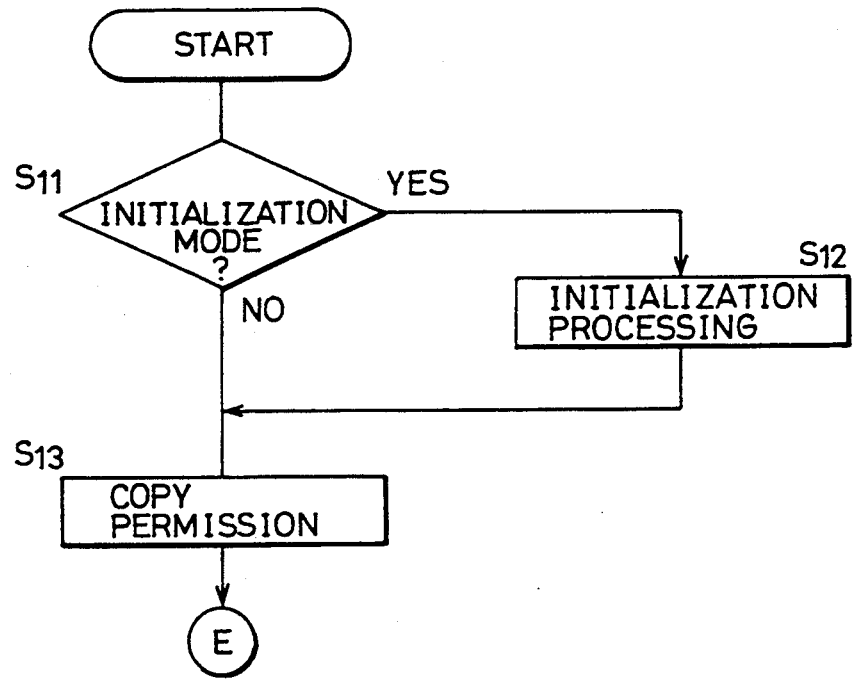

FIG. 24

| No. | DTID | EXTENSION NO. | TROUBLE FLAG | CONFIRMATION FLAG |
|---|---|---|---|---|
| 1 | DTID 1 | BANGO 1 | 0 | 1 |
| . | . | . | . | . |
| . | . | . | . | . |
| . | . | . | . | . |
| n | DTID n | BANGO n | 1 | 1 |

FIG. 25

| DATE AND TIME OF CONFIRMATION | CONFIRMATION COMPLETION FLAG | CONFIRMATION INTERVAL | NUMBER OF PIECES FOR CONFIRMATION |
|---|---|---|---|
| YYMMDDHHmm | 1 | DDHH | n |

SYSTEM OF CONTROLLING A PLURALITY OF COPYING MACHINES INTERCONNNECTED THROUGH A PRIVATE BRANCH EXCHANGE

BACKGROUND OF THE INVENTION

1. Field of the Invention

The present invention relates generally to systems for controlling copying machines, and more specifically, to a system for controlling at a control center, copying machines each having a corresponding copying machine control unit, in which a centralized control apparatus at the control center is called by each copying machine control unit through a communication line when prescribed conditions are satisfied and data communication is established between the copying machine control unit and the centralized control apparatus.

2. Description of the Related Art

A system for controlling a plurality of copying machines is disclosed in U.S. Pat. No. 4,583,834. In the disclosed system, various kinds of information on a copying machine such as the total number of sheets copied, problems, the remaining amounts of copy sheets and toner are transmitted to a computer. The computer processes the transmitted information and feeds back instructions to the copying machine.

According to such a system, remote control of a plurality of copying machines supplied to users can be made by connecting those plurality of copying machines with a centralized control apparatus through a communication network such as a telephone line. The centralized control apparatus is provided at the site of an administrator, and the administrator receives information transmitted from each copying machine by the use of the centralized control apparatus. Various administrative works are conducted such as issue of bills based on the number of copy sheets, and dispatch of serviceman to cope with problems.

A general copying machine does not have a function of communicating with a centralized control apparatus through a communication network, and, therefore, a data terminal for communication is provided for the copying machine when such a system is constructed. The data terminal collects various kinds of information from the copying machine and communicates with the centralized control apparatus based on the collected information.

From the viewpoint of the administrator of copying machines, when the data terminal provided for a copying machine is in trouble, it is preferable to prohibit the operation of the copying machine. More specifically, it is desirable for the administrator to prohibit the use of a copying machine which is not under the control of the system when the data terminal is in trouble. From the viewpoint of users, however, it would be unreasonable if the operation of a normal copying machine is prohibited because of the problems in the data terminal. Accordingly, it would be desirable to continue the operation of the copying machine regardless of the trouble in the data terminal.

Meanwhile, it is simply enough to control the state of transmission from the data terminal at the site of centralized control apparatus, in order to detect a problems associated with the data terminal. In other words, a data terminal which does not make a transmission can be determined to be faulty. However, increasing the number of transmissions from a data terminal to the centralized control unit thoughtlessly for the purpose of detecting a problems taking place in the data terminal at an early stage should be avoided, considering the cost involved.

SUMMARY OF THE INVENTION

It is an object of the invention to provide a system for controlling copying machines which takes into consideration problems associated with data terminals.

Another object of the invention is to provide a system for controlling copying machines that allows the operation of a copying machine in accordance with a prescribed procedure even when problem occurs in a data terminal.

Yet another object of the invention is to provide a system for controlling copying machines that allows early discovery of a problem in a data terminal without increasing the number of transmissions from the data terminal to a centralized control apparatus.

In order to achieve the above-stated objects, a system for controlling a plurality of copying machines interconnected through a PBX in accordance with the invention includes a plurality of data terminals provided at the plurality of copying machines, each for collecting data on a copying machine, a PBX connected to the plurality of data terminals for allowing internal communication between the plurality of data terminals, a centralized control apparatus connected to the PBX through an external communication line, abnormality detection means provided in at least one of the plurality of data terminals for detecting an abnormality in another data terminal by an internal communication through the PBX, and abnormality transmission means provided in at least one of the plurality of data terminals for executing an external communication with the centralized control apparatus through the PBX when the abnormality detection means detects an abnormality taking place in another data terminal.

In the copying machine control system thus structured, when the abnormality detection means provided at one data terminal detects an abnormality in another data terminal, an abnormality transmission is made to the centralized control apparatus through the PBX. Accordingly, appropriate control of the abnormality in each data terminal can be made.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flow chart showing the specific content of the processing routine with passwords in FIG. 5;

FIG. 8 is a flow chart showing a part of a main routine in the processing of the CPU 11 of a data terminal shown in FIG. 2;

FIG. 24 is a representation for use in illustration of the content of data in an RAM97 at the center in the system in FIG. 3;

FIG. 25 is a representation for use in illustration of storage data in the data terminal in the system in FIG. 3;

DESCRIPTION OF THE PREFERRED EMBODIMENTS

Now, embodiments of the invention will be illustrated.

[1] Structure of System

The structure of the present system consisting of "Copying Machine.Data Terminal (DT).Private Branch Exchanger (PBX).Communication Network.Center" will be illustrated.

Figure 1:
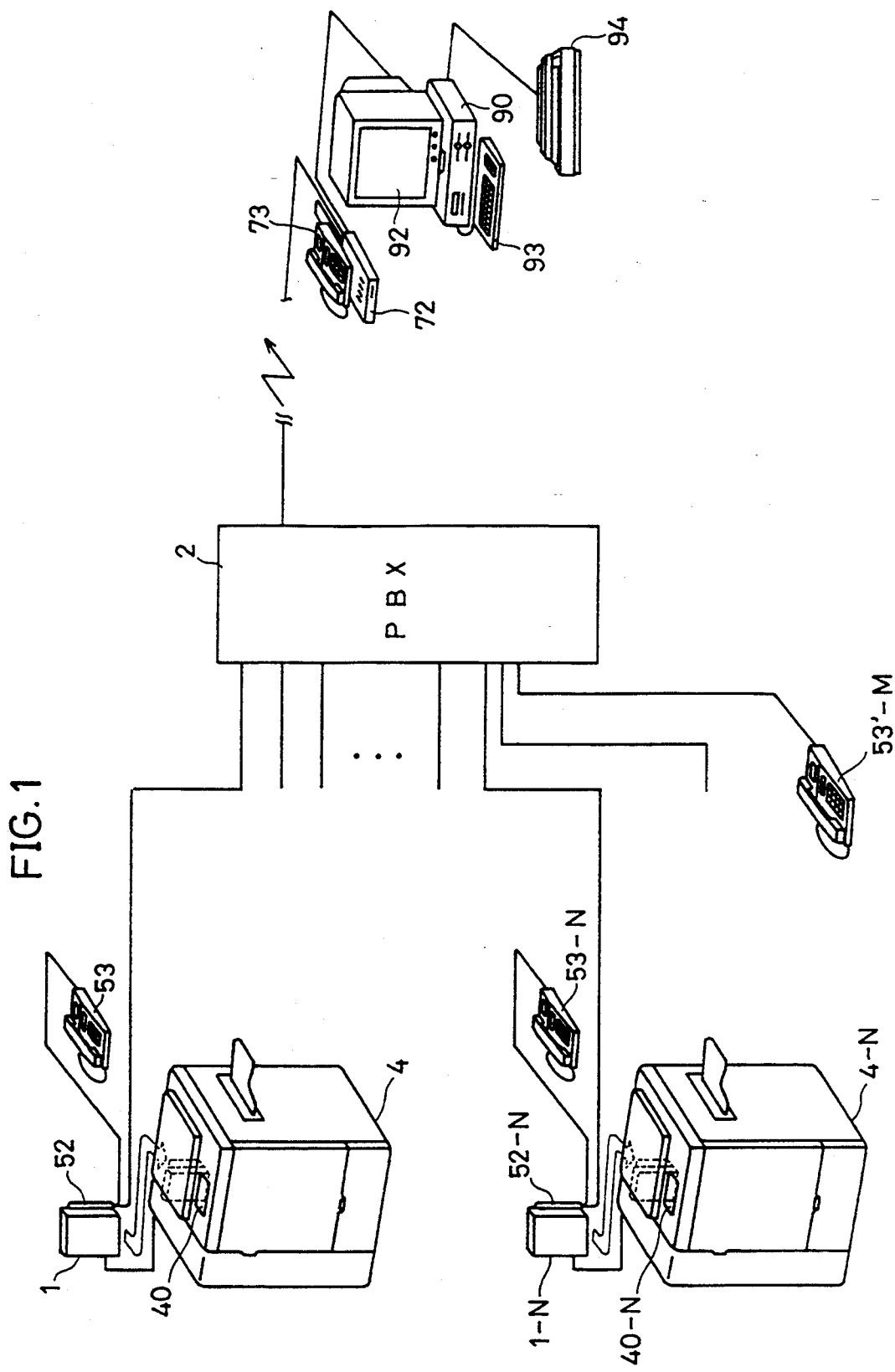
FIG. 1 is a view schematically showing the construction of a system applied in one embodiment of the invention.
Figure 2:
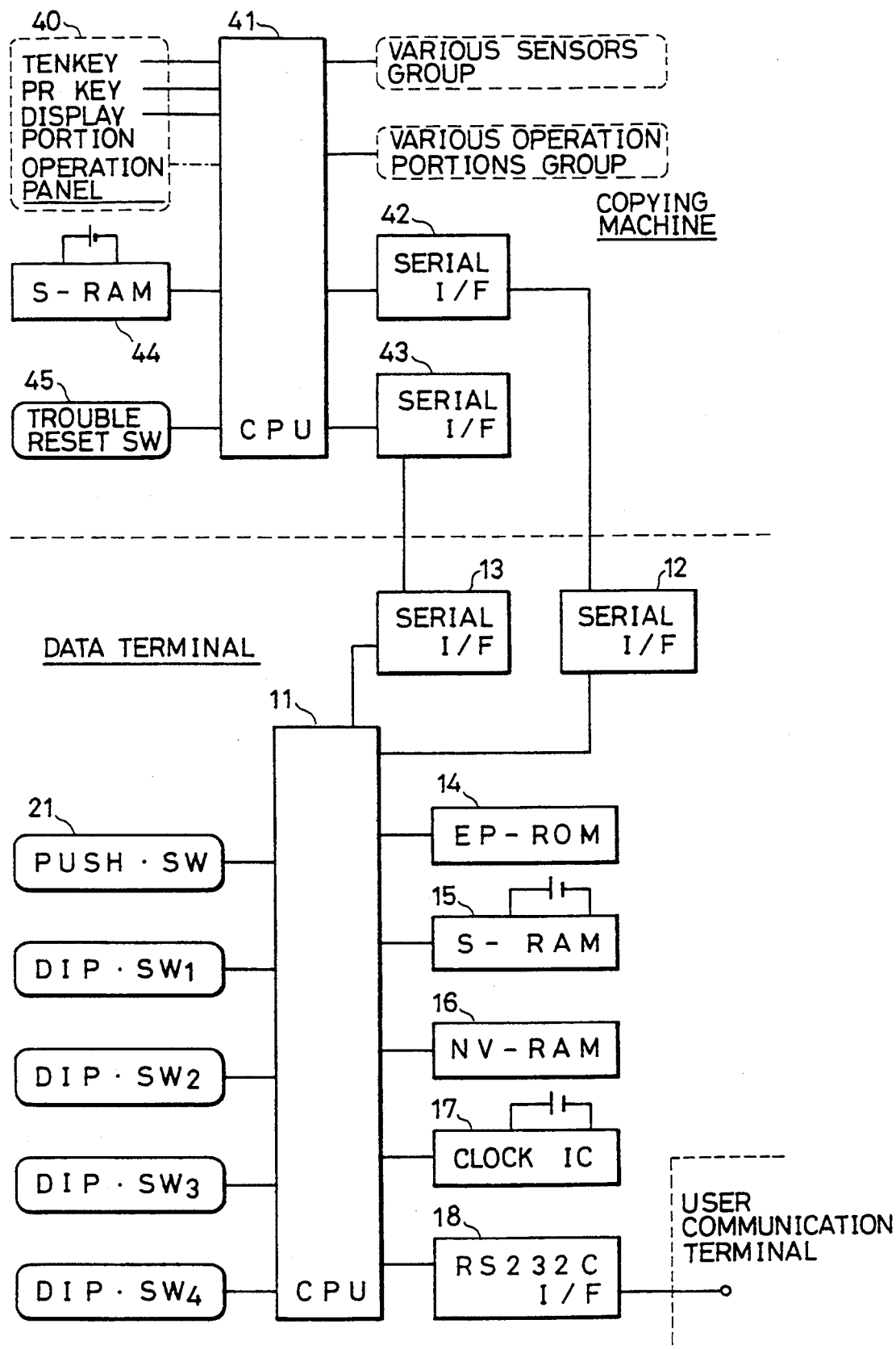
FIG. 2 is a part of a block diagram showing the circuit configuration of the system shown in FIG. 1.
Figure 3:
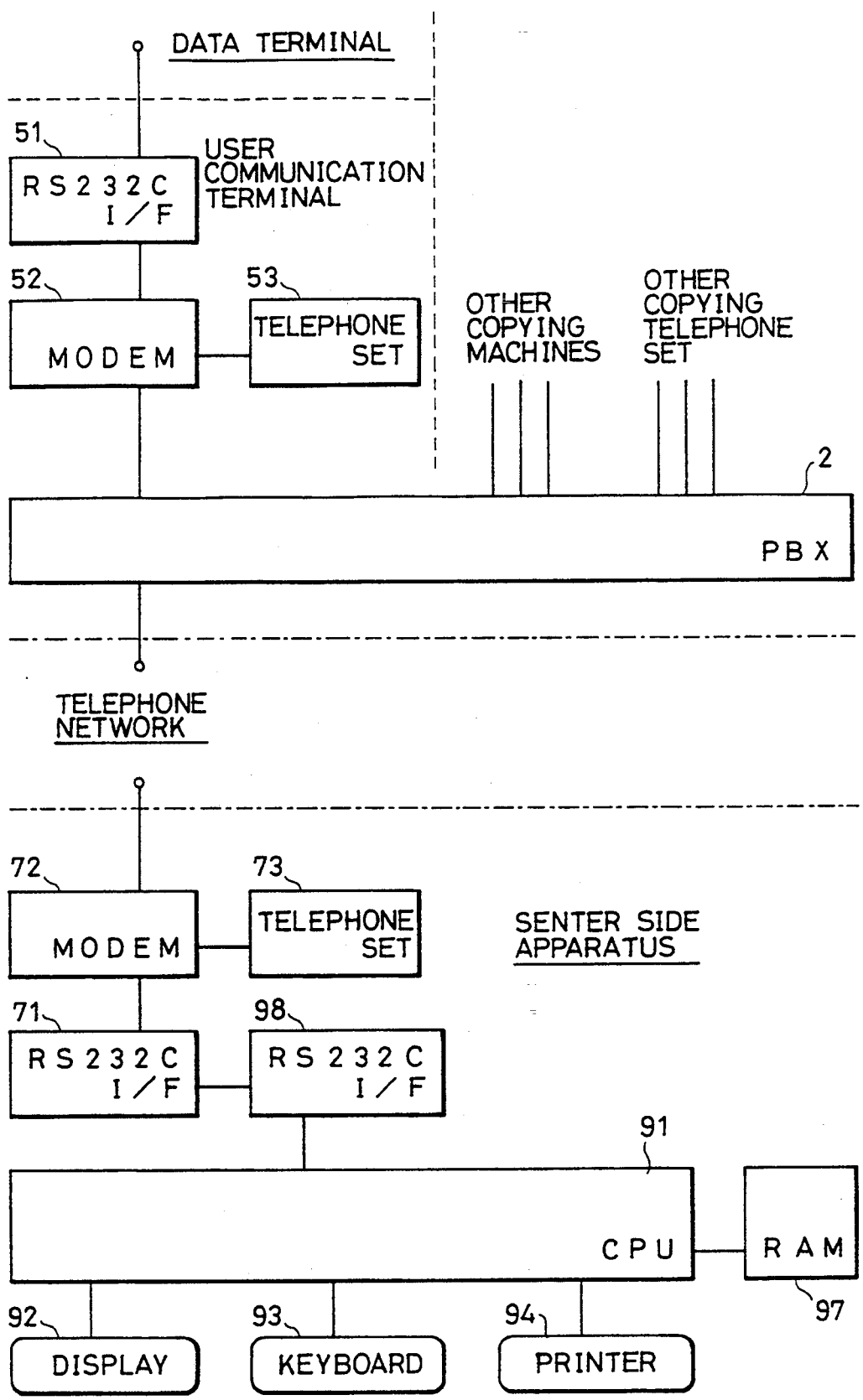
FIG. 3 is the remaining part of the block diagram showing the circuit configuration of the system shown in FIG. 1.

FIG. 1 is a view for use in illustration of the structure of the present system, and FIGS. 2 and 3 are block diagrams each showing the circuit configuration of the present system. The present system is formed of apparatuses on the side of a number of users, an apparatus on the side of the center which is an administrator, and a communication network for connecting them. It is noted that only one user among the number of users is illustrated in the figures. The user is provided with N sets of "Copying Machines 4, Data Terminals (DT) 1, Modems 52, Attached Telephone Sets 53", and M independent telephone sets 53', and a private branch exchange (PBX) of analog Type 2. In the following description, a particular one of the N sets of copying machines 4, the N data terminals 1, etc. is attached with a suffix, such as copying machine 4-1, data terminal 1-1 or copying machine 4-j, and data terminal i-j.

In the present system, the administrator, the center side is provided with a modem 72 which functions as a communication terminal apparatus, a telephone set 73 which is a usual communication apparatus, and a computer 90, and they are connected with each other. A CPU91 is installed in the computer 90, and a display 92, a keyboard 93, a printer 94, an RAM97, etc. are connected to the CPU91.

The data terminal 1 stated above accepts various kinds of information on a corresponding copying machine 4, subjects these kinds of information to prescribed processings, and transmits the processed data concerning the copying machine 4 to the computer 90 on the center side. It is possible to transmit/receive data between the data terminals of the same user through the PBX 2.

The computer 90 on the center side conducts a processing to a copying machine 4 corresponding to each data terminal of each user based on data transmitted from the data terminal 1.

Now, the respective devices will be illustrated.

[Copying Machine 4]

The copying machine 4 scans an original image and forms a copy image on paper.

In the copying machine 4, various pieces of element data (such as time required for paper feeding, the surface potential of a photoreceptor drum, the concentration of toner in a developer, the amount of exposure of the photoreceptor drum, developing bias voltage, the amount of toner sticking to the photoreceptor drum, the grid voltage of a corona charger) having effects on an image forming process are detected by various sensor groups disposed in various positions in the copying machine 4, accepted by the CPU41 for processing, and then transmitted to the CPU11 of the data terminal 1 through a serial I/F 43 and a serial I/F 13.

In the CPU41 of the copying machine 4, values in counters based on which a charge amount is calculated at the center (a total counter showing the number of sheets discharged, a counter for separate sheet sizes showing the numbers of sheets used for separate sizes), and values in counters used as a criterion for maintenance (a JAM counter for separate portions showing the number of JAMs for every portion, a trouble counter for separate portions showing the number of troubles for every portion, a PM counter for separate parts showing the number of use for every parts) are calculated and transmitted to the CPU 11 of the data terminal through a serial I/F42 and a serial I/F12. It is noted that the PM counter is for calculating of use for every parts, which count value is used, for example, as a criterion for time of parts exchange.

Figure 4:
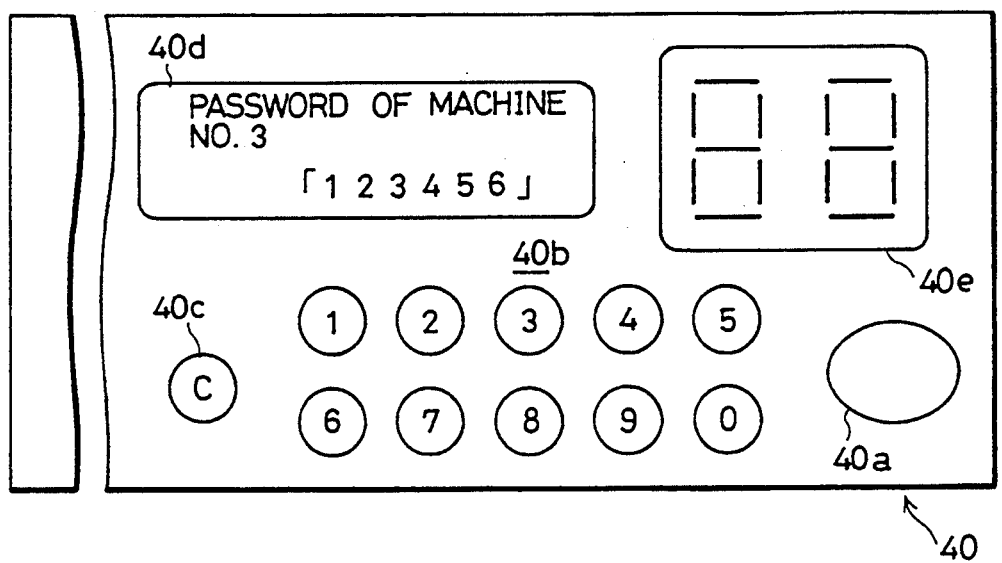
FIG. 4 is a view for use in illustration of a part of the operation panel of a copying machine in the system shown in FIG. 1.

In the CPU41 of the copying machine 4, signals from various switch groups disposed on the operation panel 40 (see FIG. 4) (a print key 40a for instructing initiation of a copying operation, a ten key group 40b for inputting values, a clear key 40c for instructing clearing of inputs, and the like) and signals from various switch groups disposed other than on the operation panel (a trouble reset switch 45 for instructing reset upon trouble or the like) are input, and setting of a corresponding operation mode is executed based on each of the input signals. The state of the copying machine (for example, warming up in progress, a JAM taking place in a paper feeding portion) is displayed on the display portion 40d, and the number of copied sheets is displayed on a value display portion 40e. Furthermore, the password of the copying machine (at the time of fixed transmission), the password of a copying machine 1-j corresponding to a data terminal 1-j in trouble (at the time of trouble transmission) are input from the CPU 11 of the data terminal 1 to the CPU41.

Furthermore, the model name and serial number of the copying machine 4 are stored in an SRAM44 connected to the CPU41 when transferred from the factory, and the data is transmitted to the CPU11 side through the serial I/F42 and the serial I/F12 in response to a transmission request from the CPU11, when the data terminal 1 is installed.

[Data Terminal 1]

When a copying machine 4 accepts and processes data, thus satisfying prescribed transmission conditions (condition in which any transmission flag is set to "1", which will be later described in detail), a corresponding data terminal 1 activates the modem 52 to have a communication line connected with the center side through the PBX2, and transmits data for management related to the copying machine 4 (element data, count data, etc. as stated above) to the CPU91 of the center.

It is possible to transmit/receive data between the data terminals of the same user through the PBX2, and as will be described later, problems associated with a trouble in the data terminal can be addressed.

Accordingly, the CPU11 of the data terminal 1 is connected to the modem 52 which is a communication terminal apparatus through a communication I/F (RS232CI/F)18 and the communication I/F (RS232CI/F) 51 of the modem 52, and the modem 52 can be connected to a modem 72 on the center side through an extension line, a PBX, and a public telephone line (external line).

Accordingly, the CPU 11 is connectable to another modem corresponding to a data terminal for another copying machine of the same user through the communication I/F (RS232CI/F) 18 of its own and the communication I/F (RS232CI/F) 51.extension.PBX.extension of the modem 52 of its own, whereby a communication with the data terminal of that another copying machine is permitted.

Figure 18:
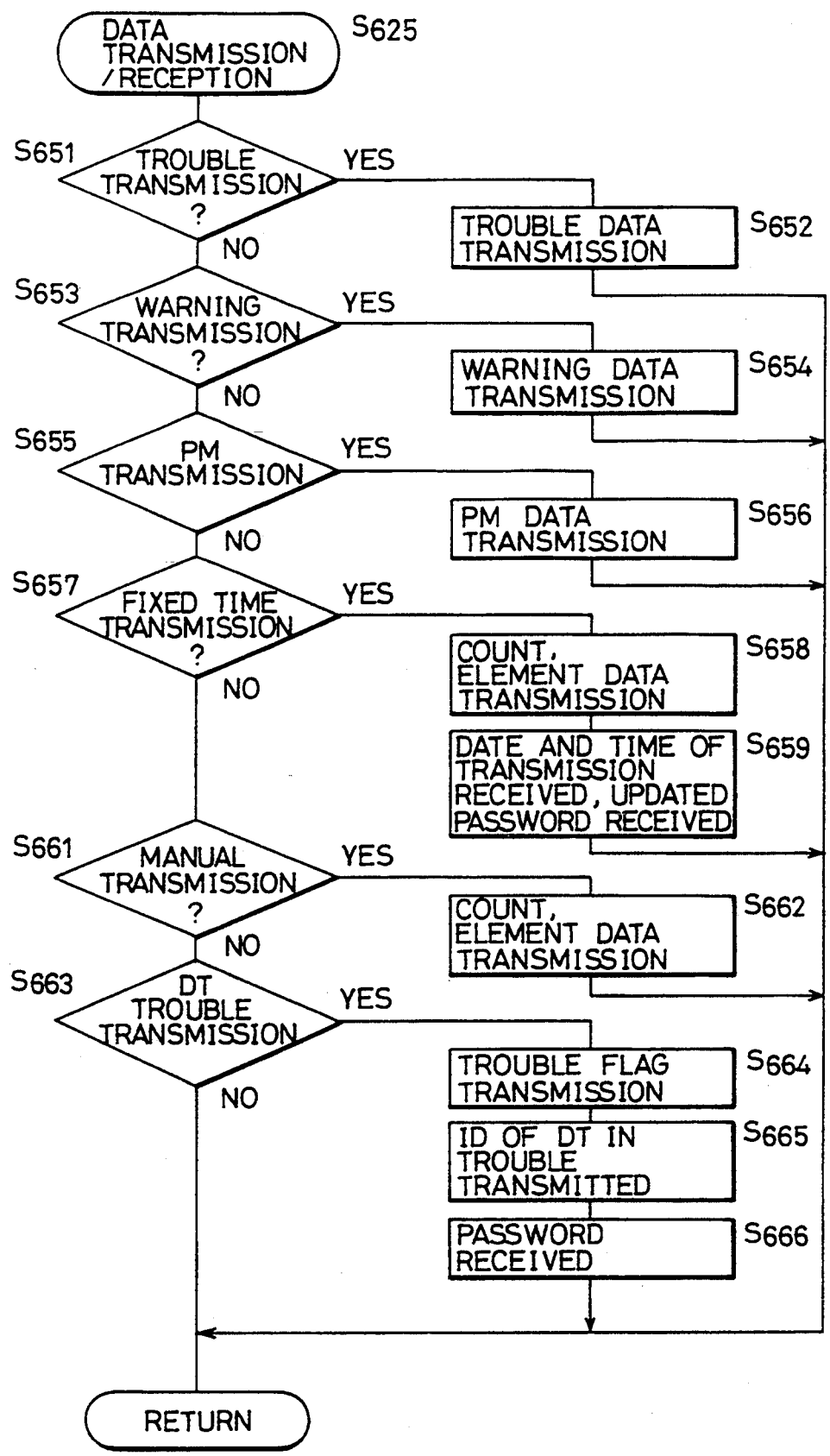
FIG. 18 is a flow chart showing the specific content of a data transmission/reception processing routine in FIG. 16.

The contents of data (data for controlling the copying machine 4) transmitted to the CPU91 of the center from the CPU11 through the telephone line is decided depending upon which transmission flag is set to "1" (see FIG. 18). For example, if an initialization transmission flag is set, the identification data of the copying machine 4 (model name.serial number), the identification data of the data terminal 1 (DTID), etc. are transmitted to the center.

Furthermore, an ROM14 in which a control program is stored, a non-volatile memory 16 in which numerical data is stored, a RAM15 for battery-backed up operations, a battery-backed up clock IC17, etc. are connected to the CPU11. The CPU11 is also connected to the above-stated CPU41 through the serial I/F12 and the serial I/F42, and the serial I/F13 and the serial I/F43, so that incoming data transmitted from the CPU41 side is input into the CPU11 for the following processing.

Stored in the non-volatile memory (NV-RAM) 16 are the extension numbers of the communication terminal apparatus (modem 52) of other copying machines controlled by the same PBX, the DTIDs of the data terminals of said other copying machines, date and time data for trouble confirmation, the telephone number of the communication terminal apparatus (modem 72) of the center, and date and time data for fixed time transmission. At the date and time for trouble confirmation, an other DT confirmation processing (FIGS. 10–14) which will be described later is executed.

Stored in the non-volatile memory 16-1 of a data terminal 1-1 attached to a copying machine 4-1 are the extension numbers BANGO-2–BANGO-N of communication terminal apparatuses (modem 52-2–modem 52-N) attached to the other copying machines 4-2–4-N of the same user in other words N-1 copying machines, data on data terminals DTID-2–DTID-N attached to the N-1 copying machines and date and time data for trouble confirmation.

In the non-volatile memory 16 of the data terminal 1-2 attached to the copying machine 4-2, the extension number BANGO-1 of the communication terminal apparatus (modem 52-1) of the copying machine 4-1, the DTID-1 of the data terminal 1-1 attached to the copying machine 4-1, and data and time data for trouble confirmation.

As described above, the extension numbers, etc. corresponding to the N-1 copying machines other than the copying machine 4-1, in other words the copying machines 4-2–4-N are stored in the non-volatile memory 16-1 of the copying machine 4-1, while only the extension number, etc. corresponding to the copying machine 4-1 is stored in the non-volatile memory 16-1 of the copying machine 4-2.

This is because troubles in the data terminals 1-2–1-N attached to the copying machines 4-2–4-N, respectively can be found if the data terminal 1-1 attached to the copying machine 4-1 functions normally, and when the data terminal 1-1 attached to the copying machine 4-1 is in trouble, the trouble can be found by the data terminal 1-2 attached to the copying machine 4-2.

The system can be constructed such that the data terminals 1-1–1-N attached to the copying machines 4-1–4-N each check all the data terminals other than itself.

[PBX]

PBX is a private branch exchanger of analog type in FIGS. 2 and 3.

Data terminals in N copying machines provided at the same user are all connected to the same PBX2 through the modem 52, thus allowing communication between the data terminals. A telephone set 53 is attached to each modem 52, and usual extension telephone sets 53' group is connected to the PBX2. Extension communication is possible between the extension telephone sets 53' through the PBX2, and dialing "0" first as an external line select number permits external telephone communication.

When a data terminal attached each of the copying machines calls the communication terminal apparatus (modem 72) of the CPU91 on the center side through the PBX, a processing such as adding "0" to the head of the telephone number as the external select number is conducted as is the case with the extension telephone set 53'. Furthermore, the data terminals each have a function of extension communication through the PBX, and the above-stated extension numbers BANGO-1–BANGO-N are transmitted as select numbers for such extension communication. Thus, communication is established with another data terminal through the PBX, and data communication such as transmission of a confirmation mode code (see S237 in FIG. 12) and transmission of a normal code or an abnormal code corresponding to a reception of the confirmation mode code (see S455, S457 in FIG. 20), etc is conducted.

[Center]

The center is formed of a computer apparatus with the CPU91 as a key element, and the modem 72 which functions as a communication terminal apparatus is connected to the CPU91 through the communication I/F (RS232CI/F) 71 of the modem 72 and the communication I/F (RS232CI/F) 98 of the CPU 91. The computer apparatus of the center controls the copying machines of a plurality of users through the data terminals attached to the copying machines.

More specifically, various kinds of data (element data, count data, etc.) is transmitted from each data terminal on the user side to the modem 72 through an extension, the PBX, and an external line (communication network), and input into the communication I/F (RS232CI/F) 71 of the modem 72 and the communication I/F (RS232CI/F) 98 of the CPU91.

Thus input data is processed at the CPU91, and data for controlling the copying machine connected to the data terminal of interest is produced and updated. For example, identification data received at the time of initialization is stored in the control data area of the RAM97. Also, at the end of every month, a charge amount is calculated based on the received data and a bill is printed out. Also at the time of fixed communication, the next fixed time transmission time data and an updated password are transmitted to the data terminal. At the time of communication by a DT trouble transmission, the password of the copying machine to which the data terminal in trouble is attached is transmitted to the data terminal which made the DT trouble transmission.

[2] Control for System

Now, control for the present system will be illustrated with respect to a processing in the CPU41, a processing in the CPU11, and a processing in the CPU91 according to the order of processing. Prior to a description, the terms "on edge" and "off edge" are defined. When a switch/sensor/signal, etc. changes its state from an off state to an on state, the state transition is defined as "on edge". Meanwhile, when a switch/sensor/signal, etc. changes its state from an on state to an off state, the state transition is defined as "off edge".

[Processing in the CPU41 of the Copying Machine 4]

Figure 5:
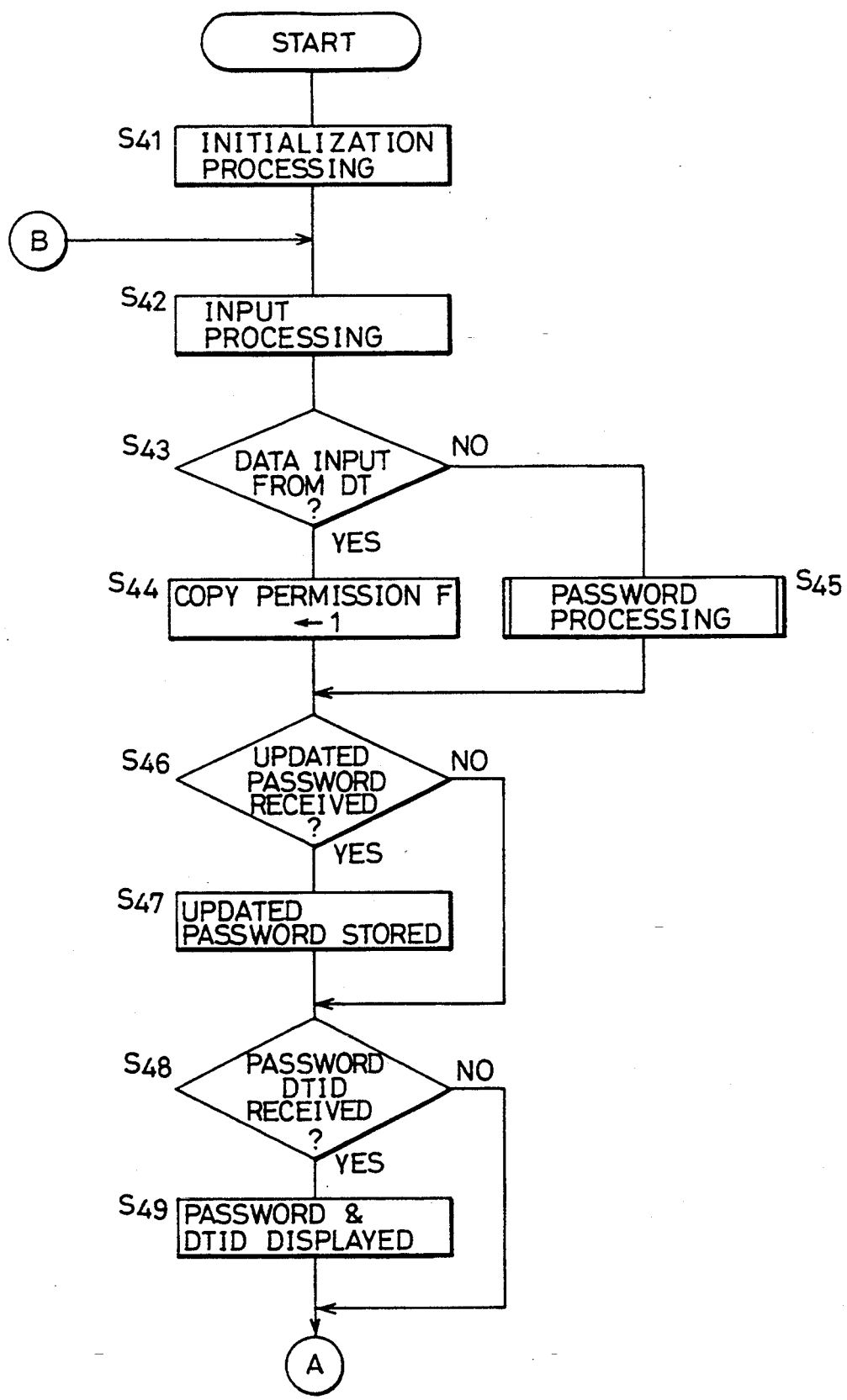
FIG. 5 is a flow chart showing a part of a main routine in the processing of a CPU41 in the copying machine shown in FIG. 2.
Figure 6:
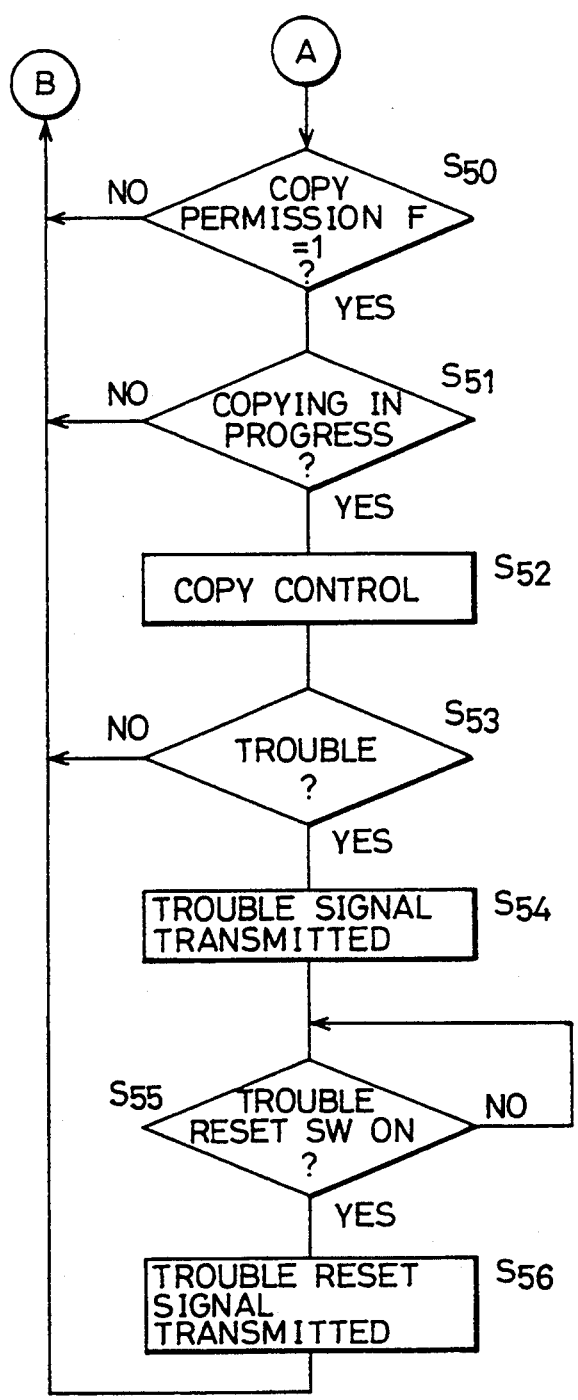
FIG. 6 is a flow chart showing the remaining part of the main routine in the processing of the CPU41 in the copying machine shown in FIG. 2.

A processing executed in the CPU41 of the copying machine 4 will be illustrated in conjunction with flow charts in FIGS. 5–7.

In the CPU41, the processing is initiated, for example, by turning on a power supply. The memory is cleared, and then initialization such as setting of a standard mode is executed (S41). Then, a loop processing after step S42 is repeatedly executed.

Step S42 represents, in block form, a process accepting various input signals. The input signals include, for example, input signals from the key switch group on the operation panel 40, the sensor group at various positions in the copying machine, and the switch group of a trouble reset switch 45, etc., or an input signal from the CPU11.

In step S43, it is determined whether or not data was input normally from the CPU11. If the determination result indicates it was normal (S43; YES), a copy permission flag is set to "1" (S44), thus permitting a copying operation.

If the data from the CPU11 was not normal (S43; NO), a password processing shown in FIG. 7 is executed (S45).

More specifically, a password is input from the ten key group 40b (S101; YES), and if the password is a correct password (S103; YES), the copy permission flag is set to "1" (S105), thus permitting a copying operation. Meanwhile, if no password is input (S101; NO), or the input password was not correct (S103; NO), the copy permission flag remains "0" (S107).

As described above, the password processing (S45) is a processing to cope with the case in which immediate prohibition of copying operation is extremely unreasonable from the user's point of view. More specifically, when the correct password is input from the operation panel 40, a copying operation can be executed, even if normal data is not input from the CPU11. The correct password to be referred to is transmitted from the center side for every communication with the center at the time of fixed transmission and stored in the memory in the following manner.

In step S46, it is determined whether or not an updated password was received, and if the result indicates that the updated password was received (S46; YES), the updated password is stored in the non-volatile memory connected to the CPU41, and the old password is erased (S47).

As will be described later, at the time of fixed transmission, a new password (updated password) is transmitted from the CPU91 of the center through the CPU11 of the data terminal (see S925 in FIG. 23/S659 in FIG. 18/S26 and 27 in FIG. 9). Accordingly, the updated password is stored by the processing of steps S46–S47 and used as safe reference data in step S45.

In step S48, it is determined whether or not the DTID of the data terminal in trouble and the password of the copying machine to which the data terminal is attached are received, and if the result indicates that they are received (S48; YES), as shown in the display portion 40d in FIG. 4, the identity of the copying machine (such as copying machine number n and copying machine belonging to the general affairs department) to which the data terminal in trouble is attached and its password are displayed (S49). Thus, the user can input the password in the copying machine to which the data terminal in trouble is attached (S45 in FIG. 7), and the copying machine can be used.

As will be described later, when a data terminal among data terminals connected to the same PBX is in trouble, and the trouble is found out by another data terminal (see other DT confirmation processing), that another data terminal conducts a DT trouble transmission to the center (see DT trouble transmission determination). The center in response returns to that another data terminal the password of the copying machine to which the data terminal in trouble is attached (see FIG. 23). Thus, the password returned to that another data terminal is transmitted to the CPU41 of the copying machine to which that another terminal is attached, and the processing of steps S48–S49 is executed in the CPU41 as a result.

In step S50, the copy permission flag is determined. If the determination result indicates that the copy permission flag is set to "1" (S50; YES), a processing after the step S51 is executed. More specifically, if copying is in progress (S51; YES), various processings necessary for the copying operation are sequentially executed (S52). Step S52 is for representing en bloc the processings necessary for the copying operation, and paper feeding control, and control of operation portion groups such as developing device control are included therein.

When a JAM or other troubles takes place (S53; YES), a trouble signal corresponding to the trouble is transmitted to the CPU11 (S54). The CPU11 in response conducts a trouble transmission (see FIG. 9).

When the trouble reset switch 45 is operated by an operator (S55; YES), a trouble reset signal is transmitted (S56). A trouble recovery transmission is conducted in the CPU11 as a result (see FIG. 9).

[Processing in CPU11 of Data Terminal 1]

A processing executed in the CPU11 of a data terminal 1 will be illustrated in conjunction with flow charts shown in FIGS. 8–20. FIGS. 8–9 represent a main routine, FIGS. 10–18 a subroutine executed in the main routine, and FIGS. 19–20 a reception interruption routine.

(a) Main Routine

Figure 9:
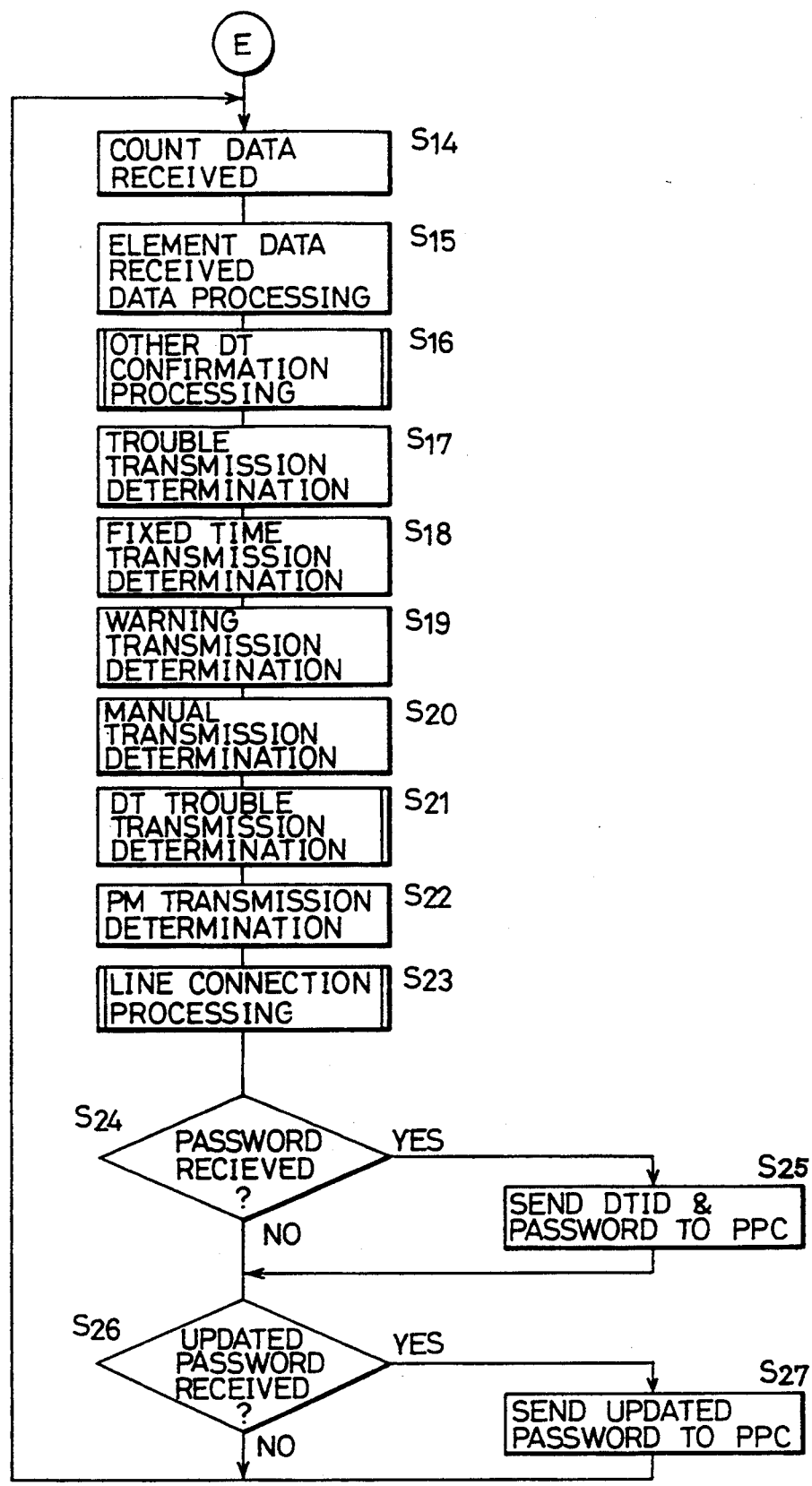
FIG. 9 is a flow chart showing the remaining part of the main routine in the processing of the CPU 11 in the data terminal shown in FIG. 2.
Figure 10:
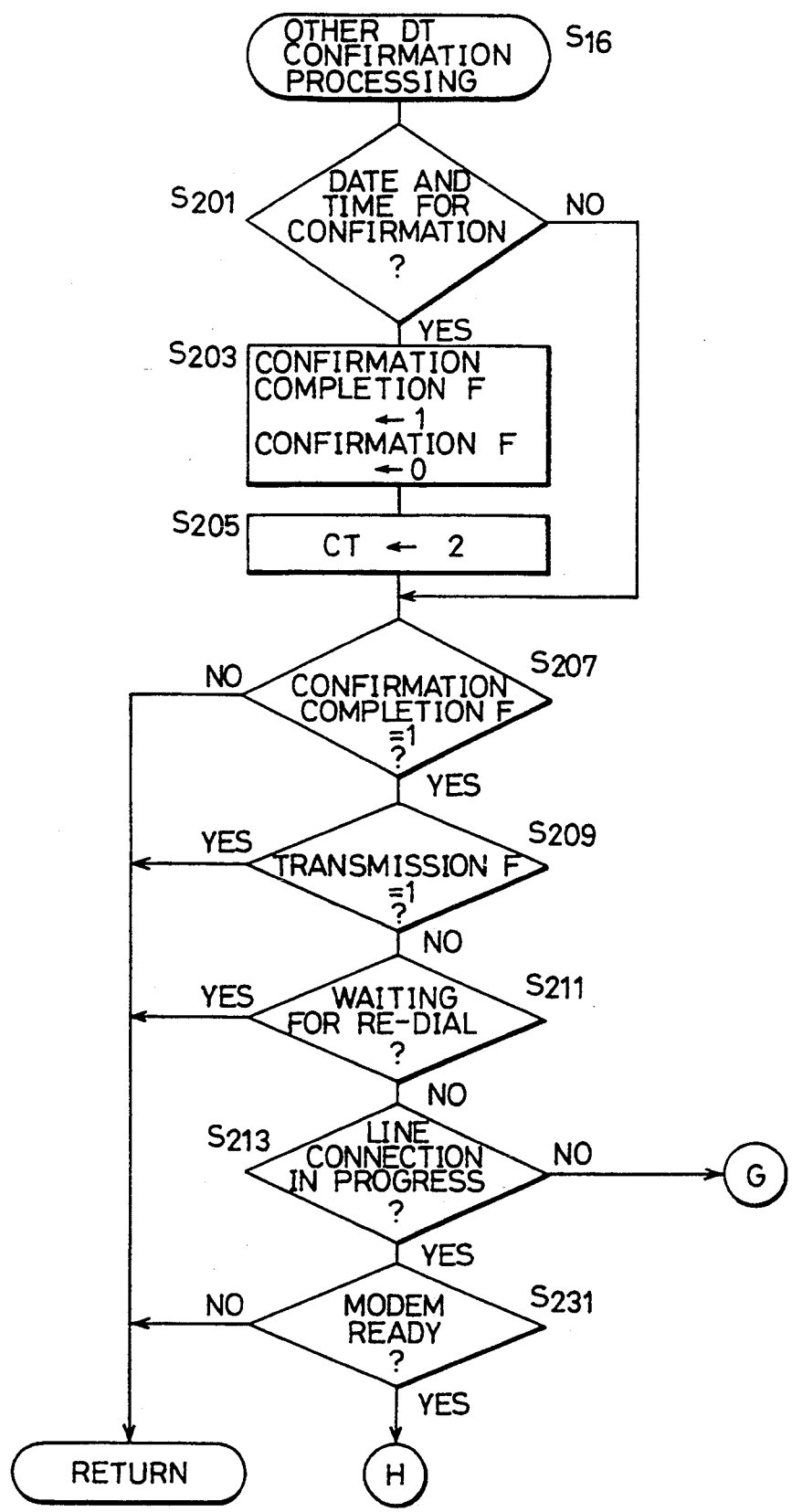
FIG. 10 is a flow chart showing a part of the specific content of a routine of other DT confirmation processing in FIG. 9.
Figure 11:
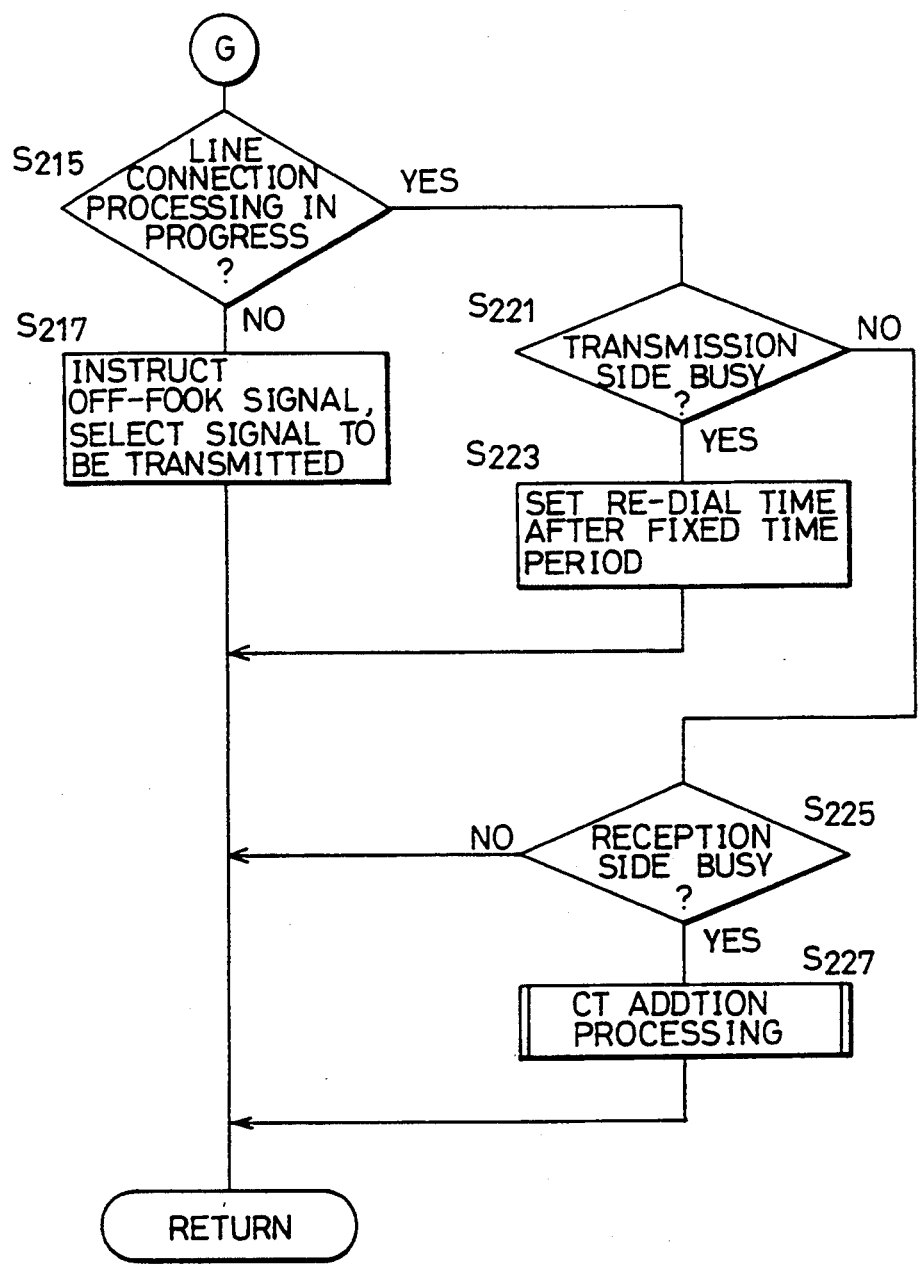
FIG. 11 is a flow chart showing another part of the specific content of other data terminal confirmation processing routine in FIG. 9.

Based on the main routine of FIGS. 8–9, the processing is schematically illustrated.

In the CPU11, the processing is initiated by, for example, turning on a power supply. If an initialization mode is set (S11; YES), an initialization processing (S12) is executed, and then a copy permission signal is transmitted to the CPU41 of a copying machine (S13). Meanwhile, if the initialization mode is not set (S11; NO), the copy permission signal is immediately transmitted (S13). After the transmission of the copy permission signal, the repetitive loop processing of steps S14–S27 is executed.

In this embodiment, although the copy permission signal is transmitted immediately after turning on the power supply, the copy permission signal may be generated periodically during the normal operation of the data terminal. In that case, the CPU41 of the copying machine prohibits the operation of the copying machine when the copy permission signal is no longer generated periodically.

The following processing is executed in steps S12, and S14–S23.

Initialization Processing: S12

When the processing is initiated and a dip switch DIPSW4 is on, more specifically, an initialization mode is set (S11; YES), the initialization processing is executed. Based on the on/off states of DIP switches DIPSW1–DIPSW3, input of the select number (telephone number) of the center, the ID number of a data terminal (DTID), and the ID number of the center (center ID) is accepted, and then an initialization transmission is conducted.

Count Data Reception Processing: S14

Processings of various kinds of count data transmitted from the CPU 41 are conducted. The contents of the data includes a discharge code, a JAM trouble code, a JAM trouble count value, count values for separate paper sheet sizes, and PM count values in the CPU 11, and these kinds of data is updated to the newest values and held therein.

Element Data Reception/Data Processing: S15

The mean value of each element data and data corresponding to standard deviation are sequentially operated and updated to the newest values.

Other Data Terminal (DT) Confirmation Processing: S16

As will be described later, at prescribed date and time determined for every DT, an extension calling is made through the PBX to a DT attached to a copying machine to be confirmed which is determined for every DT, and then a confirmation mode code is transmitted. Thus, a test mode operation is executed in the DT to be confirmed. Furthermore, a normal or an abnormal code from the DT to be confirmed is received. When the abnormal code is received, the DT trouble flag is set to "1", then the trouble transmission flag is set to "1" (see S21), and then a trouble transmission is conducted (see line connection processing).

Trouble Transmission Determination Processing: S17

The trouble transmission flag is set to "1" in response to a trouble signal (S54) from the CPU 41, while the trouble recovery transmission flag is set to "1" in response to a trouble reset signal (S56). Thus, a trouble transmission and a trouble recovery transmission are executed (see line connection processing).

Fixed Time Transmission Determination Processing: S18

At prescribed fixed transmission time determined for every DT, a fixed time transmission flag is set to "1". Thus, various kinds of count data and various kinds of element data are sent to the center (see line connection processing).

Figure 23:
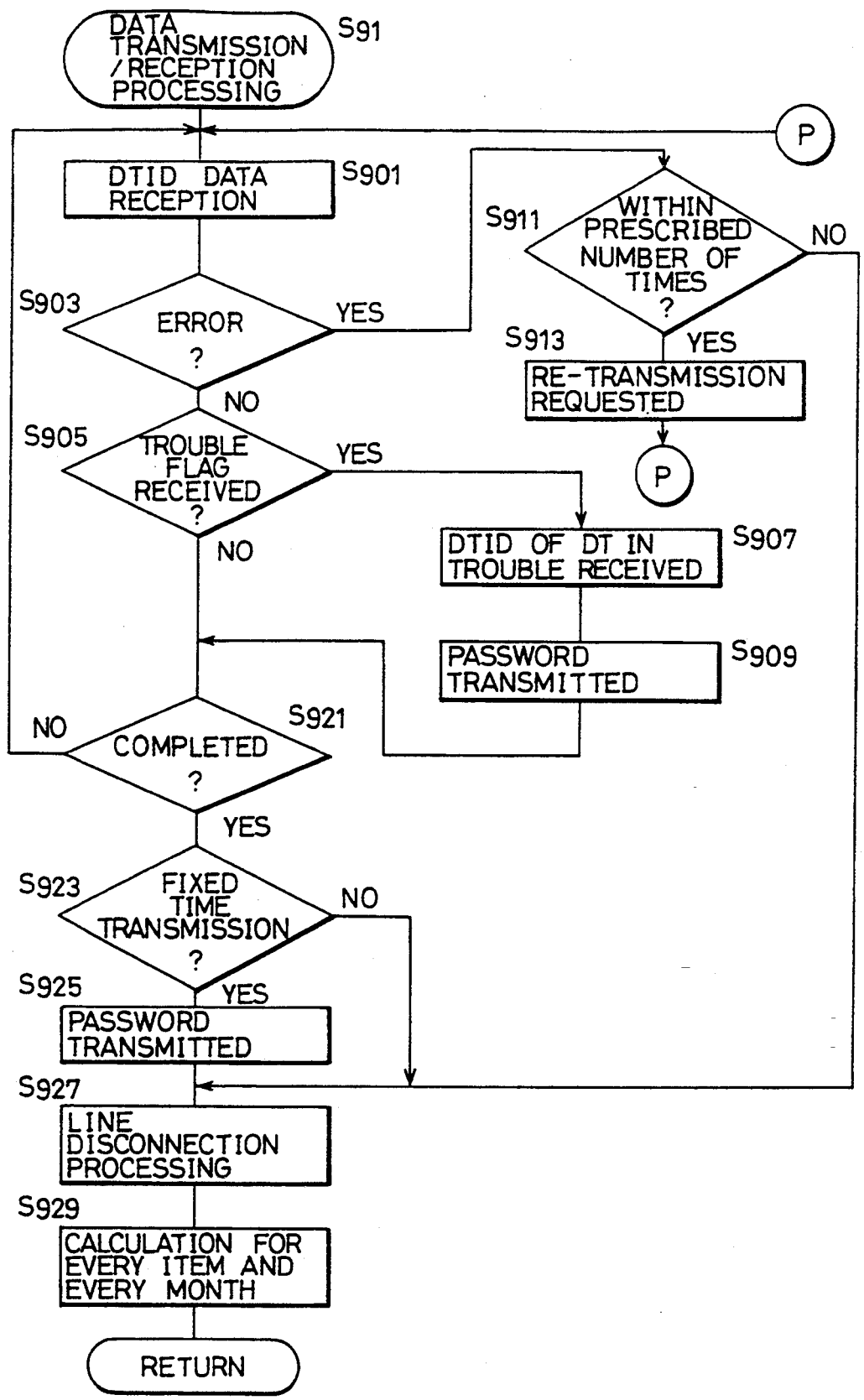
FIG. 23 is a flow chart showing the specific content of a data transmission/reception processing in FIG. 2.

After the transmission is complete, the next fixed time transmission time data, the present time data, due date data for a bill, and an updated password are returned from the center (see FIG. 23).

Warning Transmission Determination Processing: S19

Element data, the count value of the JAM counter, and the count value of the PM counter are compared to the respective prescribed threshold values.

If the comparison result indicates that they are not within a tolerance range, a warning transmission flag is set to "1". If they return within the tolerance range, a warning recovery transmission flag is set to "1". Thus, a warning transmission or a warning recovery transmission are conducted (see line connection processing).

Manual Transmission Determination Processing: S20

In a mode other than the initialization mode, when a push switch 21 is turned on, a manual transmission flag is set to "1". Thus, a manual transmission is conducted (see line connection processing), and various kinds of element data is transmitted to the center.

DT Trouble Transmission Determination Processing: S21

In the above-stated other DT confirmation processing S16, when a data terminal in trouble is found out, a trouble transmission flag is set to "1". Thus, a DT trouble transmission is conducted, the trouble flag and DTID of the data terminal in trouble are transmitted, and a password for enabling the use of the copying machine to which the data terminal is attached is returned from the center (see line connection processing).

PM Transmission Determination Processing: S22

A count value before clearing of the PM counter whose count value has been cleared to "0" by parts exchange is transmitted to the center through a PM transmission.

Line Connection Processing: S23

As will be described later, when one of transmission flag is set to "1", the modem 52 is activated and a calling of the center is conducted from the PBX to the external line side. More specifically, a processing for connecting the CPU 11 and the CPU 91 of the center is executed. After the connection of the communication line, data communication is made between the CPU 11 and the CPU 91 of the center, and data corresponding to the transmission flag is transmitted/received.

In steps S24–S27, the following processing is conducted.

A password for securing the use of the copying machine to which the data terminal in trouble is attached is transmitted from the center in response to the line connection processing activated by the DT trouble transmission (S24; YES, see FIGS. 23 and 18), and the password is transmitted to the CPU 41 of the copying machine (S25). The copying machine in response displays the name and password of the copying machine to which the data terminal in trouble is attached on the operation panel.

A new password (an updated password) for the copying machine to which the data terminal is attached is transmitted from the center in response to the line connection processing activated by a fixed time transmission (S26; YES, see FIGS. 23 and 18), and the updated password is transmitted to the CPU 41 of the copying machine (S27). The copying machine in response stores the updated password as reference data as stated above, thereby increasing the stability of the system.

(b) Sub Routine

Details of the above-stated step S16 (other DT confirmation processing), S21 (DT trouble transmission determination processing), and S23 (line connection processing) will be sequentially illustrated in conjunction with FIGS. 10–18.

Other DT Confirmation Processing (FIGS. 10–14)

In this processing, it is determined whether or not other data terminals connected to the same PBX operate normally at every prescribed confirmation date and time, and if any of them does not operate normally, the trouble flag indicating the data terminal in trouble is set to "1". Thus, a DT trouble transmission is executed (see DT trouble transmission determination processing).

At the prescribed date and time (S201; YES), a confirmation completion flag is set to "1", and confirmation flags (confirmation flag 2-confirmation flag-N) corresponding to the other copying machines 4-2-4-N, respectively are all set to "0" (S203). And the value "2" is set in the counter CT (S205). The value "2" indicates that a data terminal to be checked first is the data terminal 1-2 attached to the copying machine 4-2. The confirmation completion flag indicates that the present "other DT confirmation processing" is in progress.

When the confirmation completion flag is set to "1" (S207; YES), the modem 52-1 of its own is instructed to transmit an off hook signal for calling another modem 52-j (j corresponds to the value of the counter CT) connected thereto through the PBX and an extension select signal to the communication line, provided that all the transmission flags are reset to "0" (S209; No, a line connection processing is not executed at that time), the system is not waiting for re-dial (S211; NO), and a communication line with another modem (the modem 72 of the center or another modem connected through the PBX) is not connected (S213; NO).

Due to the processing in step S217, a determination in the next step S215 will indicate "YES". In this case, if an extension telephone set 53-1 attached to the modem 52-1 of its own is busy (the communication line being used) (S211; YES), and therefore the modem 52-1 can not transmit the signal for calling another modem 52-j connected through the PBX to the communication line, time after a prescribed-time period is set as redial time (S223). By the processing in step S223, the determination in step S211 remains "YES" until the redial time. More specifically, the processing for calling another modem 52-j (S217) is suspended until the redial time. At the redial time, by step S211; NO→step S213; NO→step S215; NO, the processing for calling that another modem 52-j is once again executed.

If the signal for calling that another modem 52-j is transmitted from the modem 52-1 of its own to the communication line by the processing in step S217 and it is determined a connection to the modem 52-j can not be made, because the modem 52-j is busy (a data terminal 1-j connected to the modem 52-j is having a communication with the center, or a telephone set 53-j attached thereto is busy), the value of the counter CT is changed (S227) in order to call another modem 52-i (i≠j) other than the modem 52-j.

More specifically, a condition that the value of the counter CT is smaller than the total modem number "N" connected through the PBX (S281; NO), the value of the counter CT is incremented by "1" (S285). Thus, a calling processing (S217) to a modem 52-j+1 which is another modem other than the modem 52-j is executed. However, a confirmation flag corresponding to the modem 52-j+1 must be reset to "0" (S287; YES). More specifically, the processing is carried out on condition a confirmation as to the presence/absence of an abnormality by the present DT confirmation processing has not been conducted on a data terminal 1-j+1 corresponding to the modem 52-j+1.

It is noted that when the value of the counter CT is larger than "N" (S281; YES), the value is returned to the initialization value "2" (S283).

Thus, a data terminal (the data terminal 1-j here) which has not been confirmed about the presence/absence of an abnormality is retrieved by a CT addition processing (S227), the modem 52-j connected to the data terminal 1-j is called by the processing in step S217, then when a communication line between the modem 52-j and an extension is established through the PBX (S213; YES), the system waits for a transmission permission state by a data transmission permission from the modem 52-j side and then the confirmation mode code is transmitted to the modem 52-j side through the PBX (S237) when the transmission permission state is rendered (S231; YES). The confirmation mode code makes the data terminal 1-j to be confirmed execute a test mode operation for determining the presence/absence of a trouble.

When the transmission of the confirmation mode code is complete (S235; YES), waiting state for an answer from the modem 52-j is provided (S241). As a result, when data from the modem 52-j is received within a waiting time period (S241; NO), a reception processing is executed (S243).

Meanwhile, if data from the modem 52-j is not received after the waiting time period elapses (S241; YES), the communication is completed deciding that a trouble is caused in the data terminal 1-j (S245).

Thus, when the communication is completed (S233; YES) by the reception of the data from the modem 52-j (S243) or not receiving data from the modem 52-j within the prescribed waiting time period, it is determined whether or not a normal code is transmitted from the modem 52-j (S251).

If the determination result indicates that the normal code has been received (S251; YES), the DT trouble flag for the data terminal 1-j corresponding to the modem 52-j is reset to "0", and the confirmation flag for the data terminal 1-j is set to "1" (S253) for indicating the completion of the trouble confirmation for the data terminal 1-j.

Meanwhile, if the normal code has not been received (S251; NO, the code has not been returned, or an abnormal code has been received), the trouble flag for the data terminal 1-j is set to "1", and the confirmation flag for the data terminal 1-j is set to "1" (S255).

Thereafter, a line disconnection processing is executed (S257).

Thus, the communication line with the modem 52-1 of its own is executed, and a data terminal 1-i which has not been confirmed about its trouble is retrieved by a CT addition processing (S263). When the data terminal 1-i is retrieved, a trouble confirmation operation by the present other DT confirmation processing is conducted to the data terminal 1-i.

When trouble confirmation is completed for all the data terminals connected to the same PBX (data terminal 1-2–data terminal 1-N) (S261; YES), the confirmation completion flag is reset to "0" (S265) for indicating that the present "other DT confirmation processing" is no longer in progress.

The "other DT confirmation processing" in FIGS. 10–14 is executed in the data terminal 1-1 corresponding to the copying machine 4-1, an operation confirmation about the presence/absence of a trouble is conducted all the data terminals (data terminal 1-2–data terminal 1-N other than the data terminal 1-1).

In the data terminal 1-2 attached to the copying machine 4-2, however, only the data terminal 1-1 needs be confirmed as described above. Therefore, in the "other DT confirmation processing" executed in the CPU 11-2 of the data terminal 1-2, the counter CT is set to "1" in step S205, while the CT addition processing in step S227 and S263 stated above is omitted. Step S277 is replaced with a processing for setting redial time.

Figure 15:
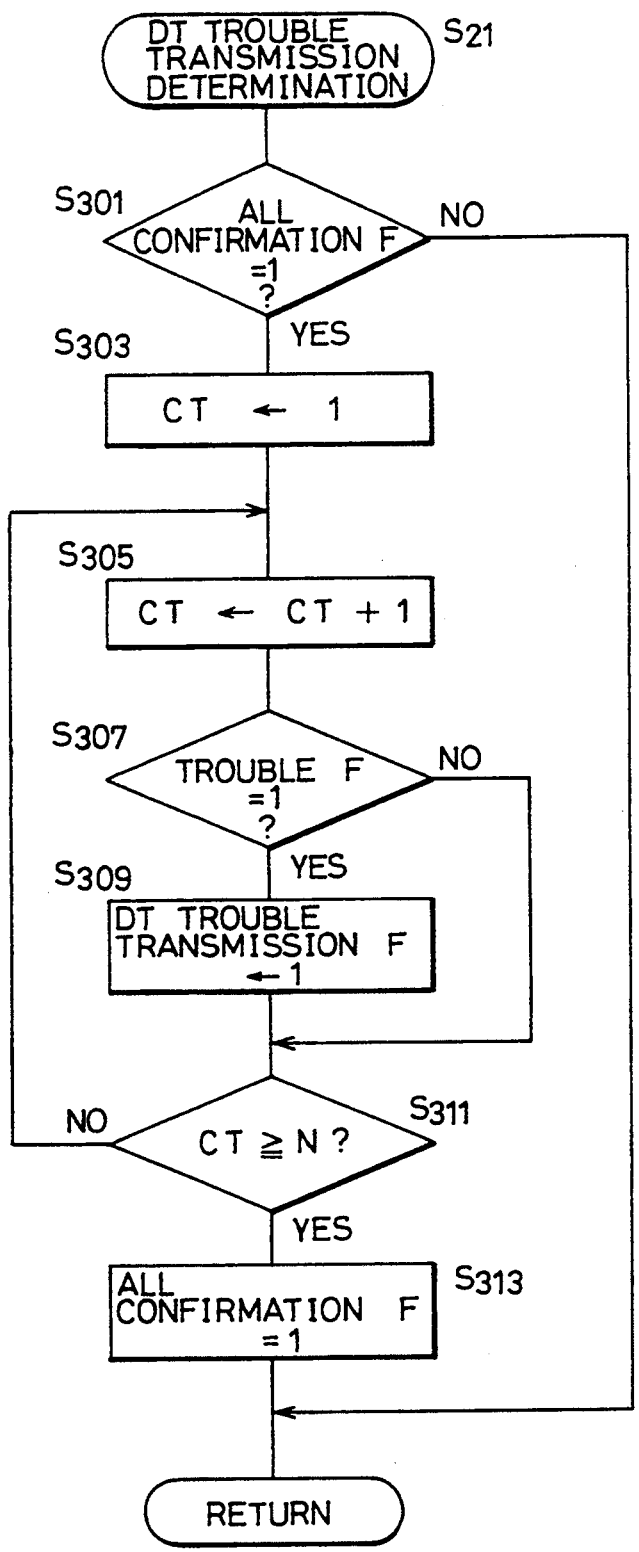
FIG. 15 is a flow chart showing the specific content of a trouble transmission determination processing routine in FIG. 9.

DT Trouble Transmission Determination Processing (FIG. 15)

In this processing, when the trouble flag of any of the data terminals is set to "1" in the above-stated other DT confirmation processing, the DT trouble transmission flag is set to "1".

On condition that the confirmation flags of data terminal 1-2–data terminal 1-N are all set to "1" (S301; YES), in other words, the above-stated trouble confirmation has been completed as to all the data terminals, the counter CT is set to "1" (S303).

When all the trouble flags of data terminal 1-2–data terminal 1-N have been determined and there exists a data terminal in trouble, the DT trouble transmission flag is set to "1".

More specifically, the value of the counter CT is incremented by "1" (S305), the trouble flag of the data terminal 1-i (i is the value of the counter CT) specified by that value is determined (S307). If the determination result indicates that the trouble flag is set to "1" (S307; YES), the DT trouble transmission flag is set to "1" (S309).

When the determination as to the presence/absence of a trouble has been completed as to all the data terminals (S311; YES), all the confirmation flags are reset to "0" (S313) for indicating that the DT trouble transmission determination processing is complete.

Since the "DT trouble transmission determination processing" in FIG. 15 is executed in the data terminal 1-1 corresponding to the copying machine 4-1, the confirmation flag and trouble flag are determined as to all the other data terminals (data terminal 1-2–data terminal 1-N).

In the data terminal 1-2 attached to the copying machine 4-2, however, the trouble confirmation has been made only as to the data terminal 1-1 as stated above. Accordingly, in the DT trouble transmission determination processing executed by the CPU 11-2 of the data terminal 1-2, the value of the counter CT needs only be limited to "1" and processed.

Figure 16:
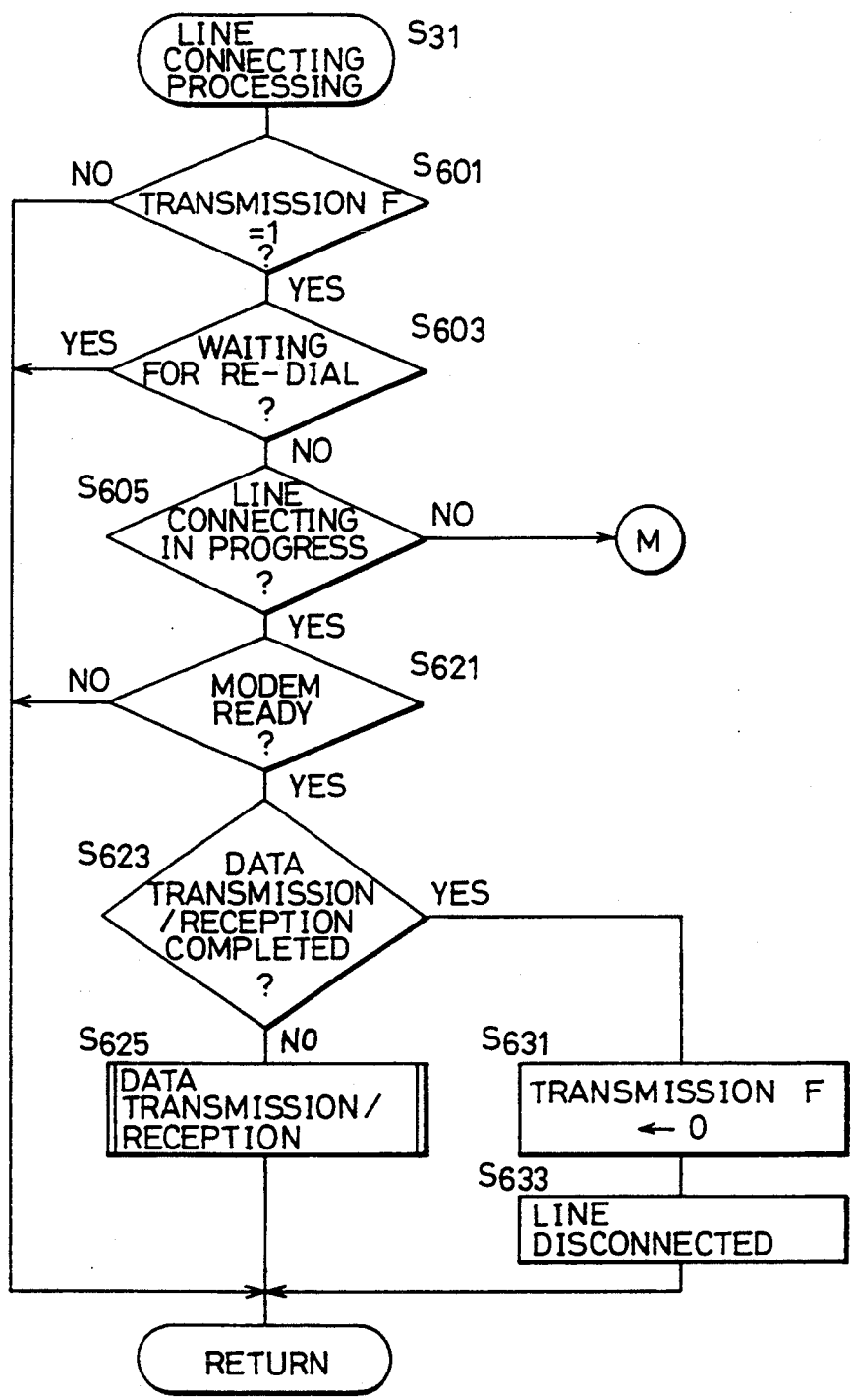
FIG. 16 is a flow chart showing a part of the specific content of a line connection processing routine in FIG. 9.
Figure 17:
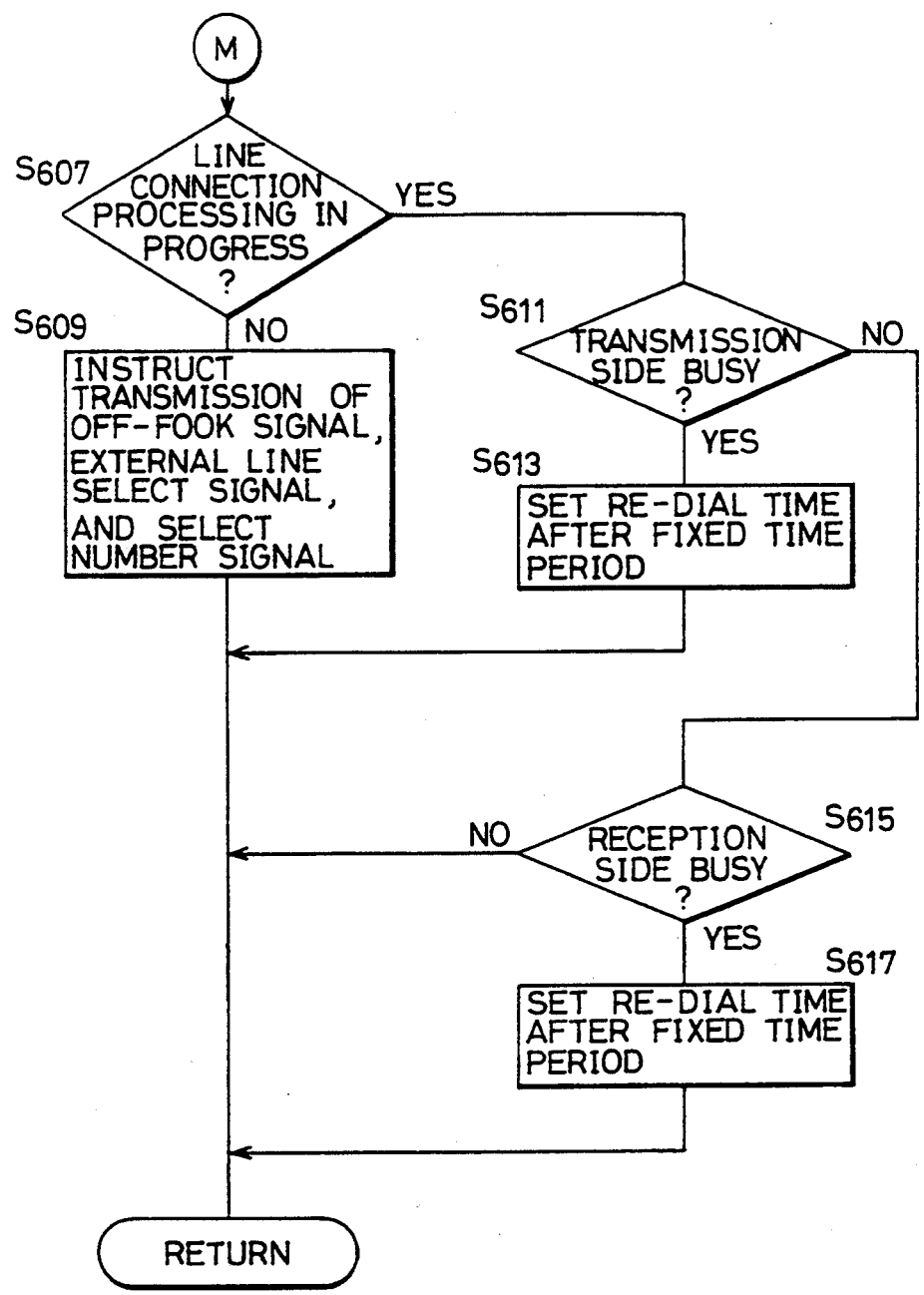
FIG. 17 is a flow chart showing the remaining part of the specific content of the line connection processing routine in FIG. 9.

Line Connection Processing (FIGS. 16–18)

The processing is activated in response to any of the transmission flags being set to "1" and the center is called as a result. After a communication line with the center side is connected, data corresponding to the transmission flag is transmitted to the center side. Meanwhile, if it is a communication by a data trouble transmission, a password for permitting the operation of a copying machine corresponding to the data terminal in trouble is transmitted from the center side. If it is a communication by a fixed time transmission, a new password (an updated password) is transmitted.

When one of the transmission flags is set to "1" (S601; YES), the modem 52-1 is instructed to transmit an off hook signal, an external line select signal, and the select number signal of the modem 72 of the center, on condition that the modem is not waiting for redial (S603; NO), a communication line with another modem (the modem 72 of the center, or another modem connected through the PBX) is not connected (S605; NO), and it is not in a waiting period after an instruction of calling the modem 72 of the center side is given to the modem 52-1. In other words, an instruction is given to call the modem 72 of the center side through the PBX/external line.

As the result of the processing in step S609, if the telephone set 53-1 attached to the data terminal 1-1 is busy, and therefore a calling of the modem 72 of the center side can not be executed (S611; YES), time after a fixed time period is set as redial time (S613). Thus, the determination in step S603 remains "YES" until that redial time, and the processing in the step S609 is suspended. At the redial time, the modem 52-1 is once again instructed to transmit the off hook signal, the external line select signal, and the select number signal of the modem 72 of the center side (S609).

When the signal for calling the modem 72 of the center is transmitted to the external line through the PBX in response to the processing in step S609 and it is determined that the modem 72 of the center is busy (when the attached telephone set 73 is busy, and when no answer is given from the CPU 91 even if a connection is made with the modem 72) (S615; YES), a redial time is set as is the case with the foregoing (S617), and the above processing in S609 is once again executed at the set redial time.

Meanwhile, when the signal for calling the modem 72 of the center (off hook signal, external line select signal, the select number signal of the center) is transmitted externally through the PBX in response to the processing in step S609, and a communication line with the modem 72 of the center is established (S605; YES), the modem attains a state of waiting for a transmission permission state by data transmission permission from the modem 72 side. Then in the transmission permission state (S621; YES), data corresponding to the transmission flag being set to "1" is transmitted to the center (S625).

More specifically, as shown in FIG. 18, trouble data is sent (S652) in the case of trouble transmission (S651; YES), warning data (S654) in the case of a warning transmission (S653; YES), and PM data (S656) in the case of a PM transmission (S655; YES).

In the case of a fixed time transmission (S657; YES), various kinds of counter data and element data are transmitted (S658), while the next fixed time transmission data and time data, updated threshold value data, and an updated password are received from the center side (S659).

If it is in the case of a manual transmission (S661; YES), various kinds of count data and element data are transmitted (S662).

Also, in the case of a DT trouble transmission (S663; YES), the trouble flag and DTID of a data terminal in trouble are transmitted (S664, S665), and a password transmitted from the center (=a password for enabling the use of a copying machine attached to the data terminal in trouble) is received (S666).

When the data communication with the center side is complete in the above-stated manner (S623; YES), the transmission flag is reset to "0" (S631), and then a disconnection processing of the communication line is executed (S633).

Figure 19:
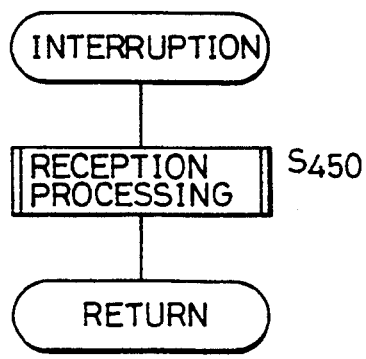
FIG. 19 is a flow chart showing an interruption processing by the CPU of a data terminal in the system shown in FIG. 3.
Figure 20:
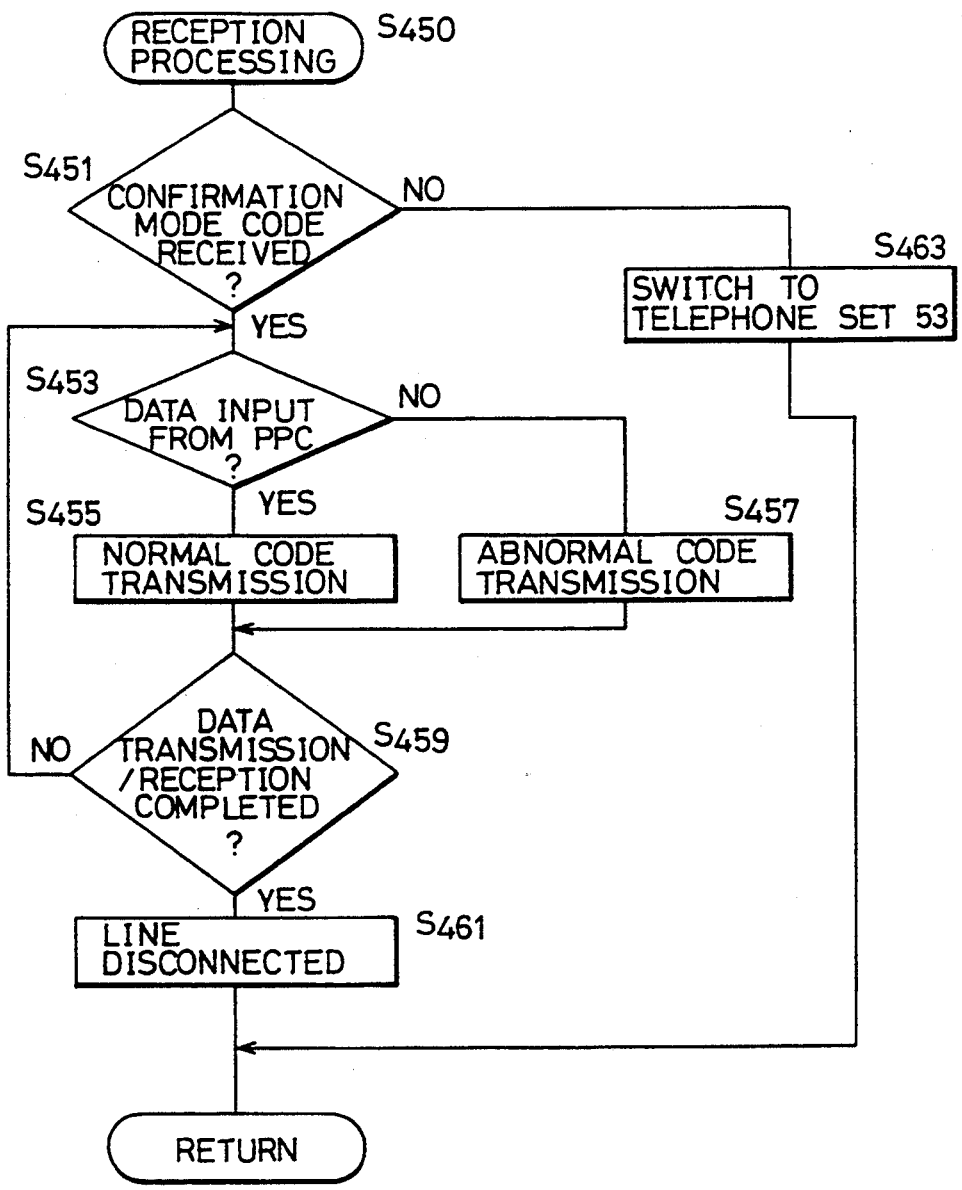
FIG. 20 is a flow chart showing the specific content of a reception processing routine in FIG. 19.

Reception Interruption Processing (FIGS. 19 and 20)

A reception interruption processing executed in the CPU 11-1 will be described. This processing is activated when a reception from a communication line (extension) is made to the modem 52-1 connected to the CPU 11-1 in response to the above-stated other DT confirmation processing executed in another data terminal.

It is determined whether or not a confirmation mode code is received within a prescribed time period (S451). If the determination result indicates that the code is not received (S451; NO), since it is a reception for usual communication, switching is made to an extension telephone set 53-1 attached to the modem 52-1 connected to the CPU 11.

Meanwhile, the confirmation mode code has been received (S451; YES), the presence/absence of data input from a corresponding copying machine 4-1 is determined (S453).

If the determination result indicate that element data is input normally from the copying machine 4-1 (S453; YES), a normal code is transmitted to the communication line (extension) from the modem 52-1 (S455). If the element data is not normally input (S453; NO), an abnormal code is transmitted (S453).

Figure 12:
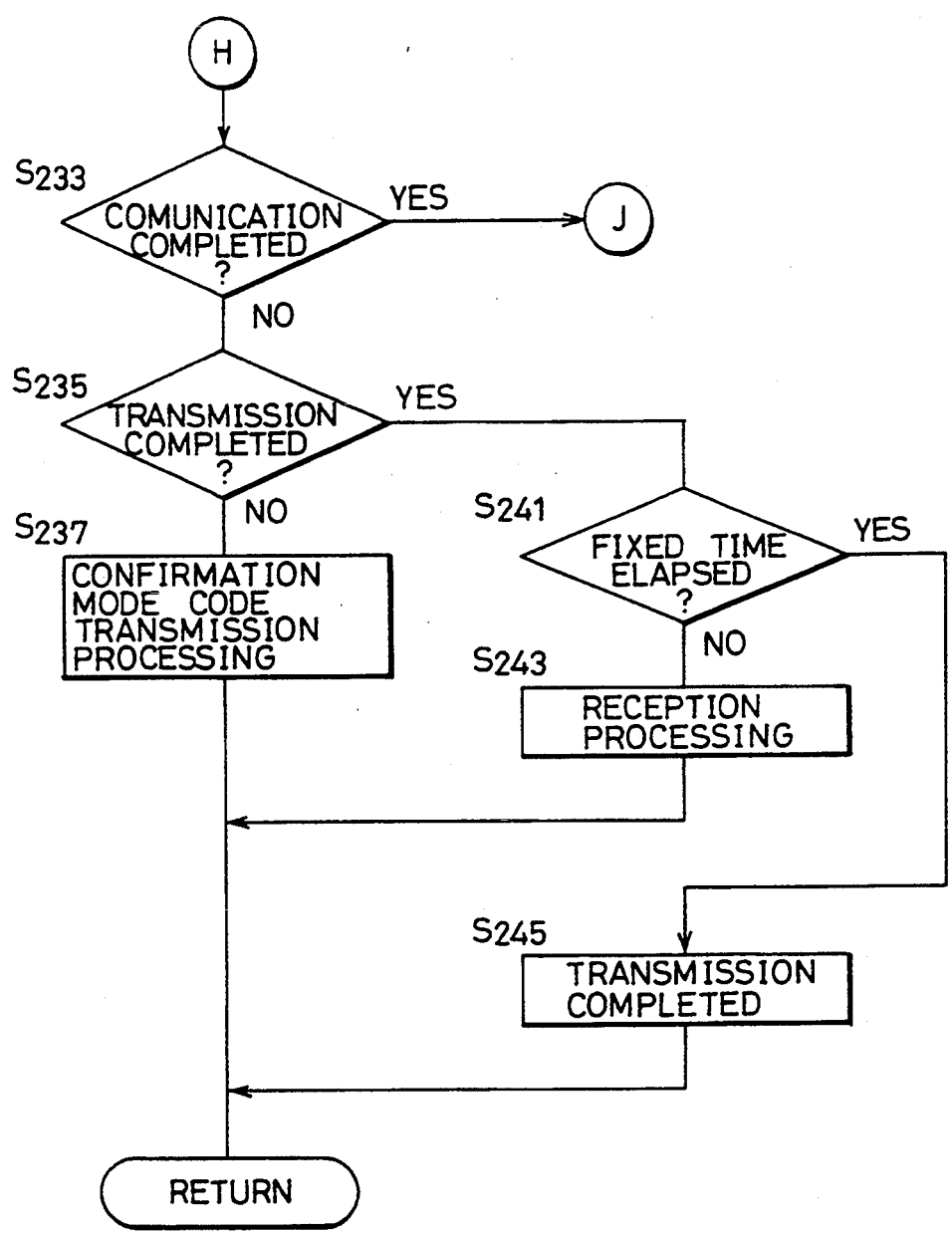
FIG. 12 is a flow chart showing another part of the specific content of other DT confirmation processing routine.
Figure 13:
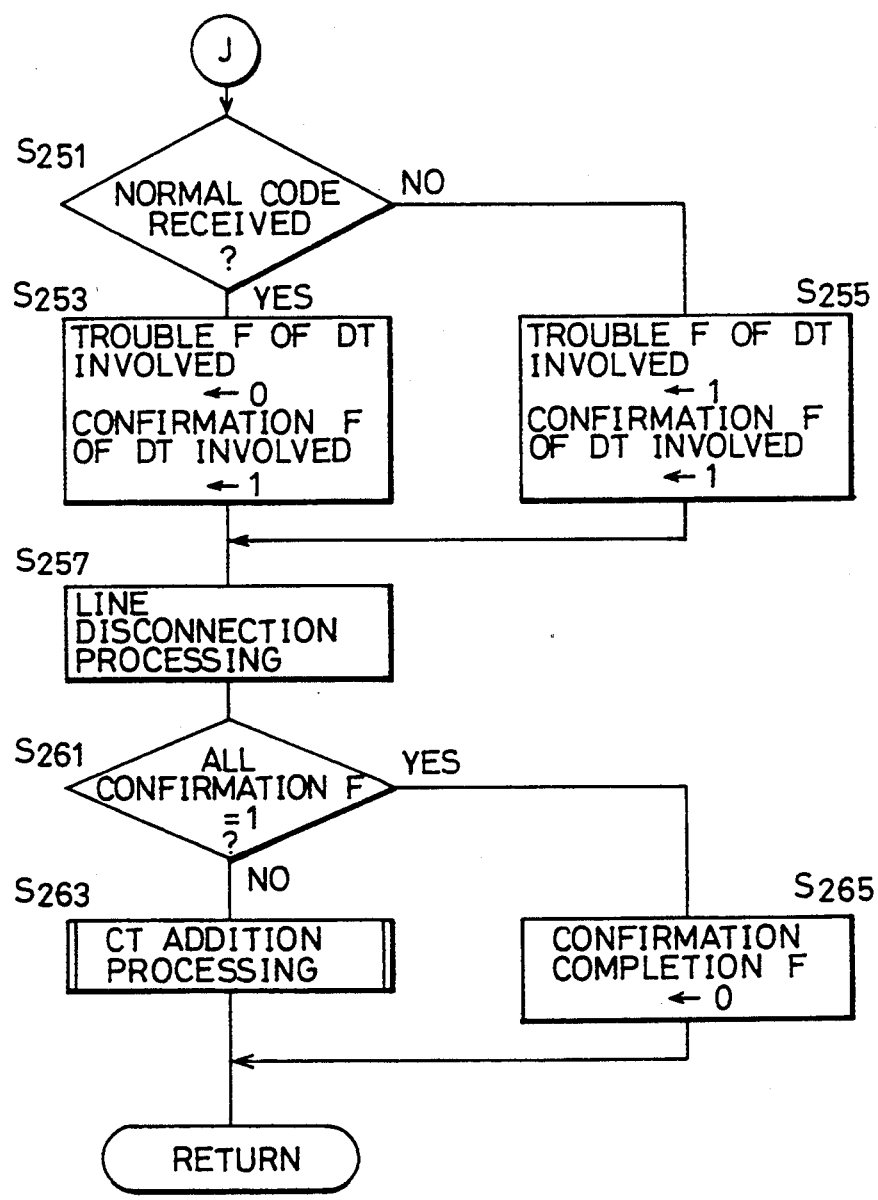
FIG. 13 is a flow chart showing the remaining part of the specific content of other DT confirmation processing routine.
Figure 14:
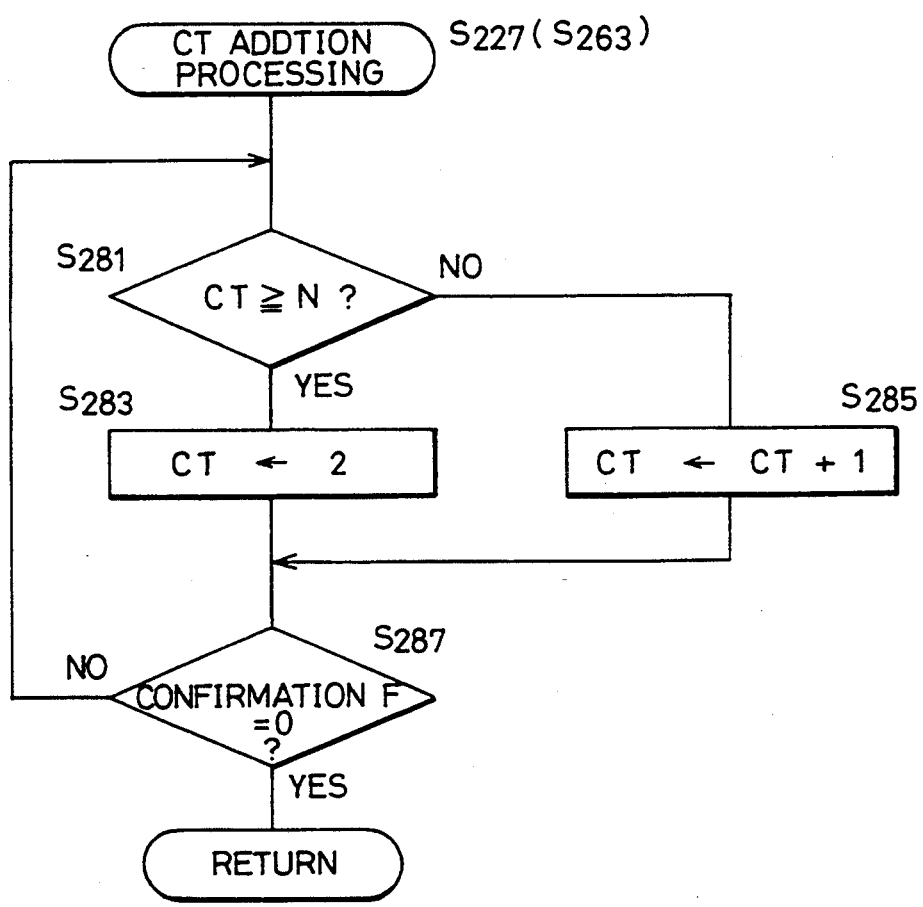
FIG. 14 is a flow chart showing the specific content of a CT addition processing routine in FIG. 11 and 13.

The above-stated normal code or abnormal code is transmitted to the side of the data terminal 1-x which has activated the reception interruption processing through the PBX, and received at the data terminal 1-x (see S243 in FIG. 12, and S251-255 in FIG. 13).

Thus, when the transmission/reception of data is complete (S459; YES), a line disconnection processing is executed (S461), thus completing the reception interruption processing.

[Processing in the CPU 91 in the Center]

Now, a processing in the CPU 91 installed in the computer 90 of the center will be described in conjunction with FIGS. 21–23.

Figure 21:
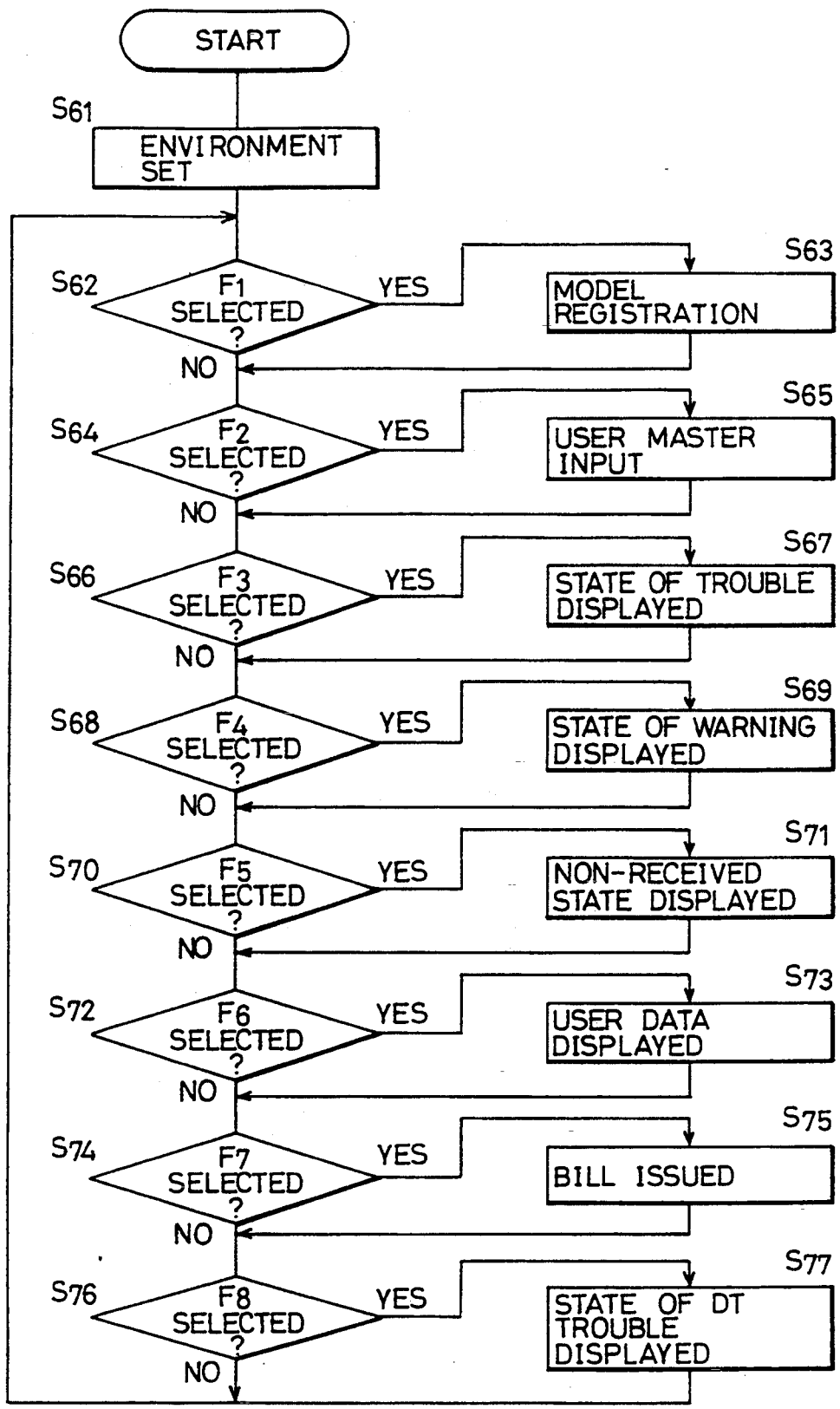
FIG. 21 is a flow chart showing a processing in the CPU of the center in the system shown in FIG. 3.

(a) F1–F8 Key Processings (FIG. 21)

In the CPU 91, the processing is initiated by turning on a power supply, and environment for modem, printer, etc. is set (S61). Thereafter, the processing attains a waiting state for a key input operation of each of the F1–F8 keys, and when a key input operation is executed, one of the following modes is set corresponding to the operation, or the following processing is executed.

F1 Key Operation (S62; YES)

Accept mode of model registration is set (S63). More specifically, registration of model, the item number of element data, the name of each pieces of element data, the threshold values for the element data, the threshold values for count data, etc. is accepted.

F2 Key Operation (S64; YES)

A registration accept mode for a user master is set (S65). Registration of, for example, the name, address, and telephone number of a user, a model, a serial number, fixed time transmission date and time, etc. is accepted for each copying machine. The DTID of each data terminal is automatically set.

F3 Key Operation (S66; YES)

The state of a trouble is displayed (S67). More specifically, user information on a copying machine which has made a trouble transmission (user name, address, telephone number, and model), the date and time of occurrence together with the content of the trouble are displayed on the display 92. The number of troubles is always displayed at a corner of the display 92 irrespective of the operation of the F3 key.

F4 Key Operation (S68; YES)

The state of warning is displayed (S69). More specifically, user information, etc. on a copying machine which has made a warning transmission together with the content of the warning are displayed on the display 92. The number of warnings made is always displayed at a corner of the display 92 irrespective of the operation of the F4 key.

F5 Key Operation (S70; YES)

The state of non-reception is displayed (S71). More specifically, user information on a copying machine which does not make a fixed transmission past prescribed fixed time transmission time. The number of non-transmission cases is always displayed at a corner of the display 92 irrespective of the operation of the F6 key operation.

F6 Key Operation (S72; YES)

A display mode for user data is attained (S73). More specifically, when a user is selected, information on that user is displayed on the display 92. When a sub menu is selected, the count values of various counters of each copying machine of the user (total counter, counter for separate paper sizes, JAM counter, trouble counter, PM counter) and element data are displayed for every month or for every item.

F7 Key Operation (S74; YES)

A bill is printed out (S75). A printer 94 is activated, and a charge amount calculated based on the count value of the total counter and a prescribed formula is printed out as a bill.

F8 Key Operation (S76; YES)

The state of a trouble is displayed (S77). The CPU 91 has user data as shown in FIG. 24 in the RAM 97, and a data terminal in trouble (i.e. its trouble flag is set to "1") is displayed based on the data.

Figure 22:
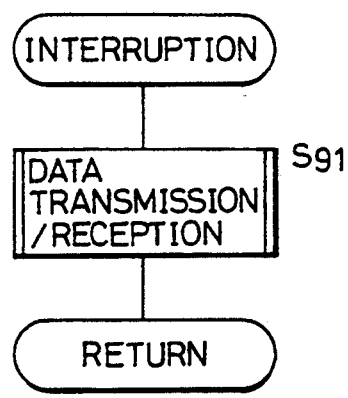
FIG. 22 is a flow chart showing an interruption processing in the CPU of the center in the system shown in FIG. 3.

(b) Interruption Processing (FIGS. 22–23)

In the CPU 91, incoming data transmitted from the data terminal side is received by an interruption, and the received data is subjected to a prescribed processing (S91).

When a reception is detected from a communication line to the modem 72, and an interruption is generated in the CPU 91 as a result, the DTID of the data terminal of the transmitting party (data terminal 1-1 here) and the data are received (S901). When a communication error is generated in the course of reception (S903; YES), re-transmission of data to the data terminals 1-1 is requested (S913), on condition that the number of errors is within a prescribed number (S911; YES). When the number of errors is larger than that prescribed number (S911; NO), the line is disconnected (S927), thus completing the interruption.

If a trouble flag is present in the data received in step S901 (S905; YES), the DTID of the data terminal in trouble (data terminal 1-n here) is received (S907), and the password of the copying machine 4-n to which the data terminal 1-n is attached is transmitted to the side of the data terminal 1-1 (S909).

When the reception processing in S901 is complete (S921; YES), it is determined whether or not the present communication was conducted by a fixed time transmission, and if it was a communication by a fixed time transmission (S923; YES), an updated password for the copying machine 4-1 to which the data terminal 1-1 is attached which has made the present transmission is transmitted (S925).

Thereafter, the communication line is disconnected (S927), and calculation for every item/every mouth is conducted (S929).

Figure 26:
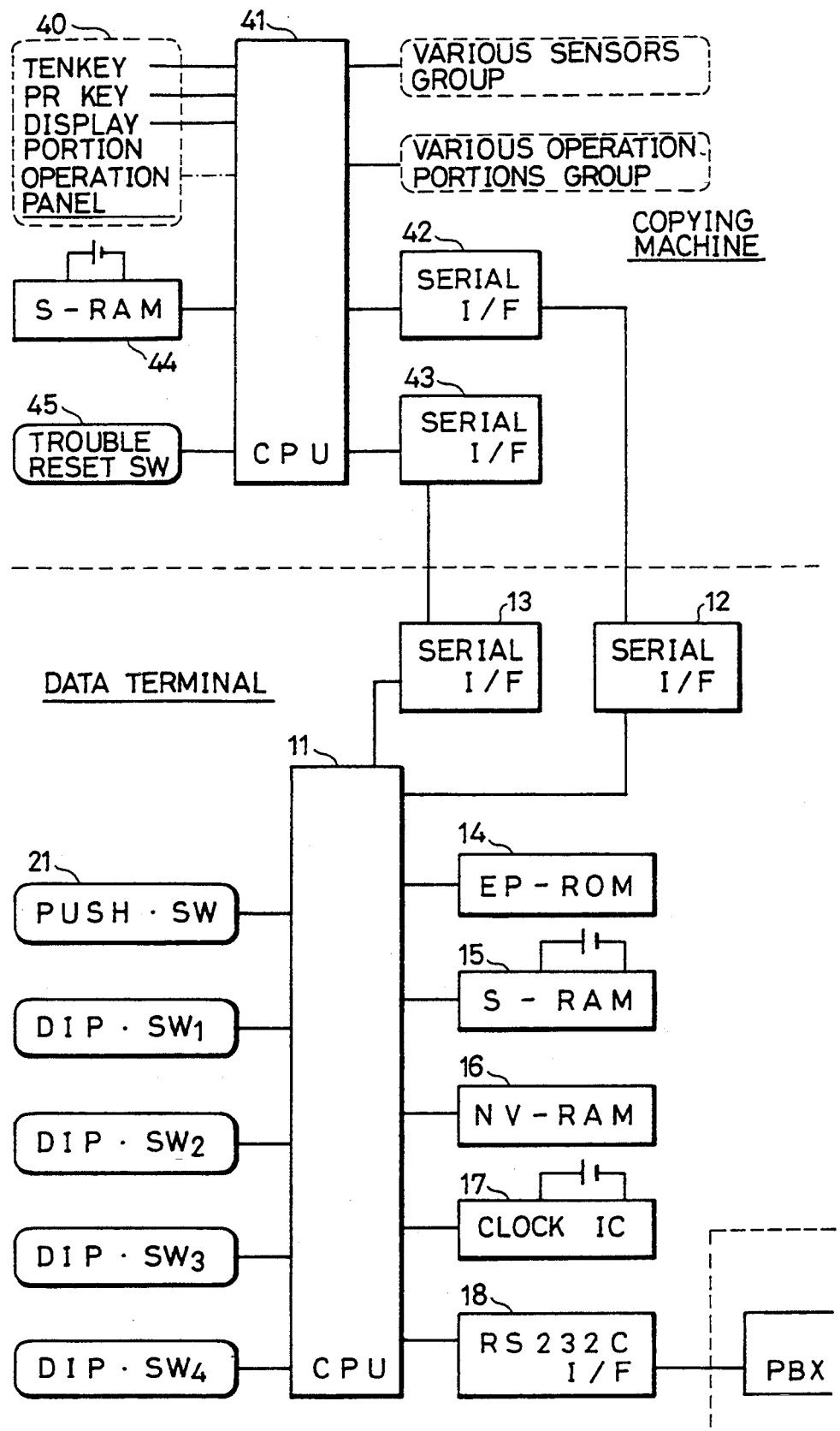
FIG. 26 is a part of a block diagram showing the circuit configuration of a system in accordance with another embodiment of the invention.
Figure 27:
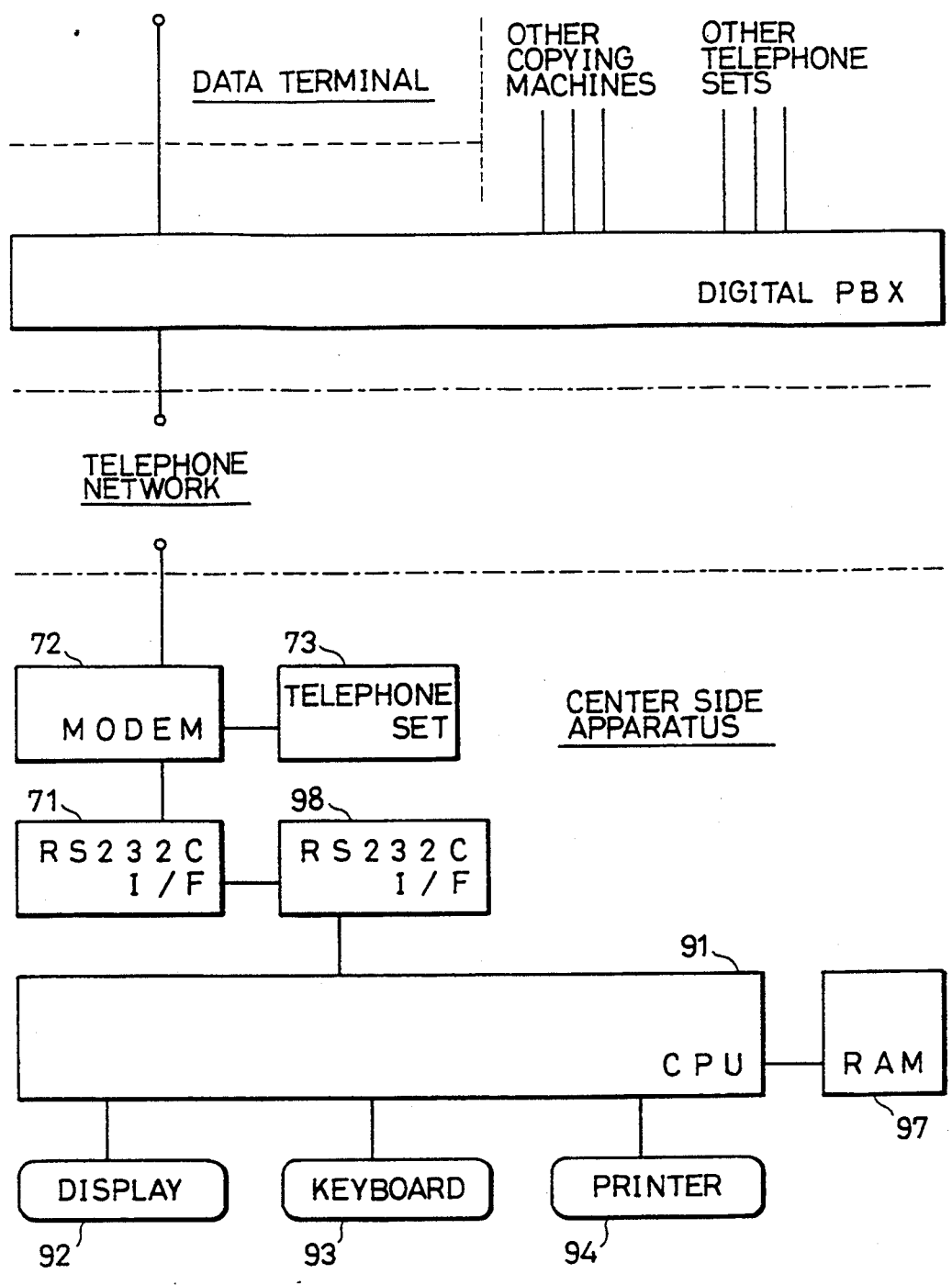
FIG. 27 is the remaining part of the block diagram showing the circuit configuration of the system in accordance with that another embodiment in FIG. 26.

Although a PBX of analog type is utilized as the PBX in the above-described embodiment, as illustrated in FIGS. 26 and 27, the PBX may be provided with a modem function by establishing a connection between each data terminal/each extension telephone set and a digital PBX utilizing a digital line. In that case, communication can be made between the data terminals directly with the digital line, it will be easier to detect a trouble.

Both a PBX of analog type and a PBX of digital type may be utilized as the PBX (Private Branch Exchanger) in the above embodiment.

As for combinations for allowing the copying machine control units connected to the same PBX to be monitored by one another, any combination can be employed if it can monitor abnormal situations such as troubles in all the copying machine control without exception. Accordingly, the system can be structured so that a plurality of copying machine control apparatus are monitored by a certain copying machine control apparatus, and the certain copying machine control apparatus may be monitored by the other copying machine control units.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine control system for controlling a plurality of copying machines, comprising:
   a plurality of data terminals respectively associated with each of the plurality of copying machines for collecting data on the copying machines;
   a PBX connected to said plurality of data terminals for allowing internal communication to take place between said plurality of data terminals;
   a centralized control unit connected to said PBX through an external communication line;
   abnormality detection means provided in at least one of said plurality of data terminals for detecting an abnormality in another data terminal by the internal communication through said PBX; and
   abnormality transmission means provided in at least one of said plurality of data terminals for executing an external communication with said centralized control unit through said PBX when said abnormality detection means detects an abnormality in another data terminal.

2. A copying machine control system as recited in claim 1, wherein
   said abnormality detection means executes the internal communication through said PBX at a prescribed time.

3. A copying machine control system as recited in claim 1, wherein
   said abnormality transmission means transmits, to said centralized control unit, an identification code of the data terminal whose abnormality is detected.

4. A copying machine control system as recited in claim 1, wherein
   a copying machine associated with the data terminal whose abnormality is detected by said abnormality detection means is prohibited from operating.

5. A copying machine control system as recited in claim 4, further comprising:
   password transmission means provided in said centralized control unit for transmitting a password to cancel the prohibition of the operation of the copying machine associated with the data terminal whose abnormality is detected;
   password reception means provided in at least one of said plurality of data terminals for receiving the password transmitted from said password transmission means; and display means for displaying the password which said password reception means receives.

6. A copying machine control system for controlling first and second copying machines, comprising:
   a first data terminal associated with said first copying machine for collecting data on said first copying machine;
   a second data terminal associated with said second copying machine for collecting data on said second copying machine;
   a PBX connected to said first and second data terminals for allowing internal communication between said first data terminal and said second data terminal;
   a centralized control unit connected to said PBX through an external communication line;
   first abnormality detection means provided in said first data terminal for detecting an abnormality in said second data terminal by an internal communication through said PBX;
   first abnormality transmission means provided in said first data terminal for calling said centralized control unit by an external communication through said PBX, when said first abnormality detection means detects an abnormality in said second data terminal;
   second abnormality detection means provided in said second data terminal for detecting an abnormality in said first data terminal by an internal communication through said PBX; and
   second abnormality transmission means provided in said second data terminal for calling said centralized control unit by an external communication through said PBX, when said second abnormality detection means detects an abnormality in said first data terminal.

7. A copying machine control system as recited in claim 6, wherein
   said first and second data terminals include first and second storage means, respectively, for storing time for said first and second abnormality detection means to operate.

8. A copying machine control system as recited in claim 6, wherein
   said first abnormality transmission means transmits the identification code of said second data terminal to said centralized control unit.

9. A copying machine control system as recited in claim 6, wherein
   said first copying machine is prohibited from operating when said first data terminal attains an abnormal state, and said second copying machine is prohibited from operating when said second data terminal attains an abnormal state.

10. A copying machine control system as recited in claim 9, further comprising:
    a password transmission means associated with said centralized control unit for transmitting passwords for canceling the prohibition of the operation of said first and second copying machine;
    first and second password reception means provided in said first and second data terminals, respectively, for receiving the passwords transmitted from said password transmission means; and
    display means for displaying the passwords which said password reception means receives.

11. A copying machine control system for controlling at least three copying machines, comprising:
    a main data terminal associated with a particular one of said at least three copying machines for collecting data on said particular copying machine;
    a plurality of sub data terminals each associated with each of the copying machines other than said particular copying machine for collecting data on each of the copying machines other than said particular copying machine;
    a PBX connected to said main and sub data terminals for allowing an internal communication to take place between said main data terminal and each of said sub data terminals;
    a centralized control unit connected to said PBX through an external communication line;
    abnormality detection means provided in said main data terminal for detecting an abnormality in each of said sub data terminals by using an internal communication through said PBX;
    first storage means provided in said main data terminal for storing a prescribed time to execute detection of an abnormality in each of said sub data terminals by said abnormality detection means;
    second storage means provided in said main data terminal for storing the telephone number of said centralized control unit and the extension number of each of said sub data terminals;
    detection control means provided in said main data terminal for reading the extension number of each of said sub data terminals stored in said second storage means at the prescribed time stored in said first storage means to operate said abnormality detection means; and
    abnormality transmission means provided in said main data terminal for reading the telephone number of said centralized control unit stored in said second storage means to execute an external communication with said centralized control unit through said PBX, when said abnormality detection means detects at least one abnormality in a sub data terminal.

12. A copying machine control system as recited in claim 11, wherein
    said abnormality transmission means transmits to said centralized control unit, the identification code of the sub data terminal whose abnormality is detected.

13. A copying machine control system as recited in claim 11, wherein
    when one of said sub data terminals attains an abnormal state, the copying machine associated with that sub data terminal is prohibited from operating.

14. A copying machine control system as recited in claim 13, further comprising:
    password transmission means provided in said centralized control unit for transmitting a password for canceling the prohibition of the operation of the copying machine associated with the sub data terminal whose abnormality is detected;
    password reception means provided in said main data terminal for receiving the password transmitted from said password transmission means; and
    display means for displaying the password which said password reception means receives.

* * * * *